United States Patent
Li et al.

(10) Patent No.: US 11,574,362 B2
(45) Date of Patent: Feb. 7, 2023

(54) AI-BASED VEHICLE SUPPORT SYSTEM AND METHOD FOR USE THEREWITH

(71) Applicant: Tricolor Holdings, LLC, Dallas, TX (US)

(72) Inventors: Zhi (James) Li, Southlake, TX (US); Saurabh Sarkar, Mason, OH (US)

(73) Assignee: Tricolor Holdings, LLC, Irving, TX (US)

( * ) Notice: Subject to any disclaimer, the term of this patent is extended or adjusted under 35 U.S.C. 154(b) by 159 days.

(21) Appl. No.: 17/196,104

(22) Filed: Mar. 9, 2021

(65) Prior Publication Data
US 2022/0292595 A1    Sep. 15, 2022

(51) Int. Cl.
| | |
|---|---|
| *G06Q 30/06* | (2012.01) |
| *G06Q 40/02* | (2012.01) |
| *G06N 20/00* | (2019.01) |
| *G06N 20/20* | (2019.01) |

(52) U.S. Cl.
CPC ........... *G06Q 40/025* (2013.01); *G06N 20/00* (2019.01); *G06N 20/20* (2019.01); *G06Q 30/0601* (2013.01); *G06Q 30/0609* (2013.01); *G06Q 30/0631* (2013.01); *G06Q 30/0641* (2013.01); *G06Q 40/02* (2013.01)

(58) Field of Classification Search
None
See application file for complete search history.

(56) References Cited

U.S. PATENT DOCUMENTS

| | | | | |
|---|---|---|---|---|
| 10,606,984 | B1 * | 3/2020 | Kaye | G16H 20/10 |
| 11,080,725 | B2 * | 8/2021 | Dagley | G06F 17/18 |
| 11,151,461 | B2 * | 10/2021 | Miller | H04L 67/12 |
| 2015/0193743 | A1 * | 7/2015 | Simmons | G06Q 40/02 |
| | | | | 705/39 |
| 2016/0350850 | A1 * | 12/2016 | Shields | G06Q 40/025 |

(Continued)

OTHER PUBLICATIONS

Georges, H.M., et al., "GNSS/Low-Cost MEMS-INS Integration Using Variational Bayesian Adaptive Cubature Kalman Smoother and Ensemble Regularized ELM," Mathematical Problems in Engineering, 2015, Hindawi Limited. (Year: 2015).*

(Continued)

*Primary Examiner* — Nicholas D Rosen
(74) *Attorney, Agent, or Firm* — Garlick & Markison; Bruce E. Stuckman

(57) ABSTRACT

A vehicle transaction support system operates by: generating, based on customer prequalification data and extended bureau data and utilizing a customer grading engine having a first artificial intelligence model trained via machine learning, a customer grade that predicts a likelihood of transaction default associated with a customer; generating, based on customer profile data that includes the customer grade and other customer profile data and utilizing a vehicle recommendation engine having a second artificial intelligence model trained via machine learning, vehicle options data that indicates vehicles selected from a vehicle database; and generating, based on at least a portion of the customer profile data and the vehicle options data and utilizing a transaction recommendation engine having a third artificial intelligence model trained via machine learning, terms data associated with each of the vehicles selected from the vehicle database.

14 Claims, 27 Drawing Sheets

(56) References Cited

U.S. PATENT DOCUMENTS

| | | | | |
|---|---|---|---|---|
| 2019/0012603 | A1* | 1/2019 | Miller | H04L 67/535 |
| 2019/0105801 | A1* | 4/2019 | Martinez | B01F 35/00 |
| 2020/0311586 | A1* | 10/2020 | Sandstrom | G06N 7/005 |
| 2020/0334694 | A1* | 10/2020 | Dagley | G06N 20/20 |
| 2020/0342478 | A1* | 10/2020 | Dalinina | G06N 20/20 |
| 2020/0357060 | A1* | 11/2020 | Dalinina | G06K 9/6232 |
| 2021/0326957 | A1* | 10/2021 | Hoover | G06Q 30/0639 |
| 2022/0343197 | A1* | 10/2022 | Merrill | G06N 20/20 |

OTHER PUBLICATIONS

Anon., "Investopedia Stock Analysis: Consolidating Debt: What If You Have Bad Credit?" Weblog post, Newstex Finance & Accounting Blogs, Newstex. Apr. 6, 2015. (Year: 2015).*

Singletary, M., "The facts on how your credit history can—and cannot—factor into a job offer," The Washington Post [Washington, D.C.]Sep. 7, 2016, p. A. 13. (Year: 2016).*

Verma, R. et al., "Role of Telematics in Motor Insurance: A Way Forward," Academy of Marketing Studies Journal, suppl. Special Issue 3 25: 1-8, Allied Business Academies. (Year: 2021).*

* cited by examiner

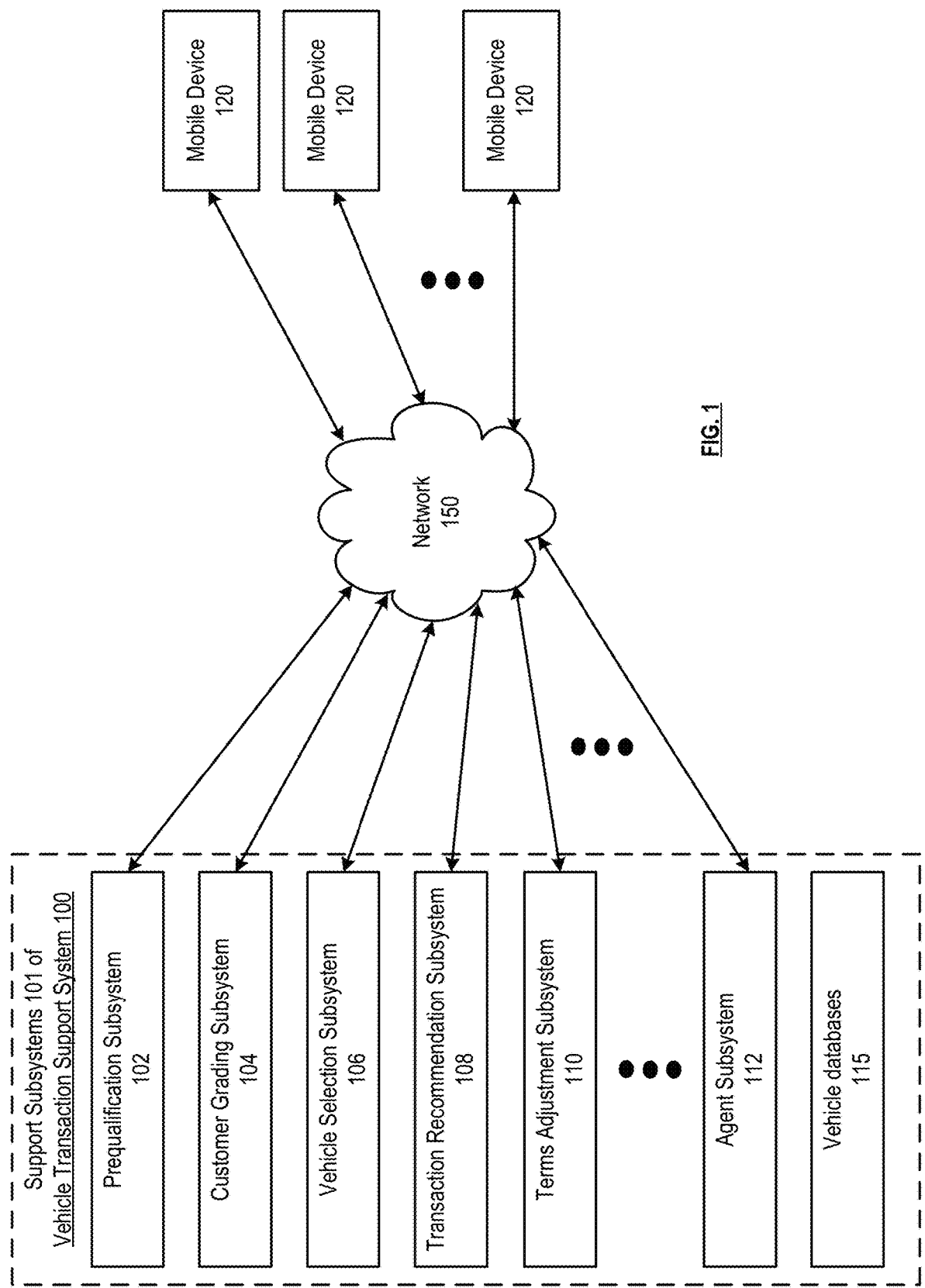

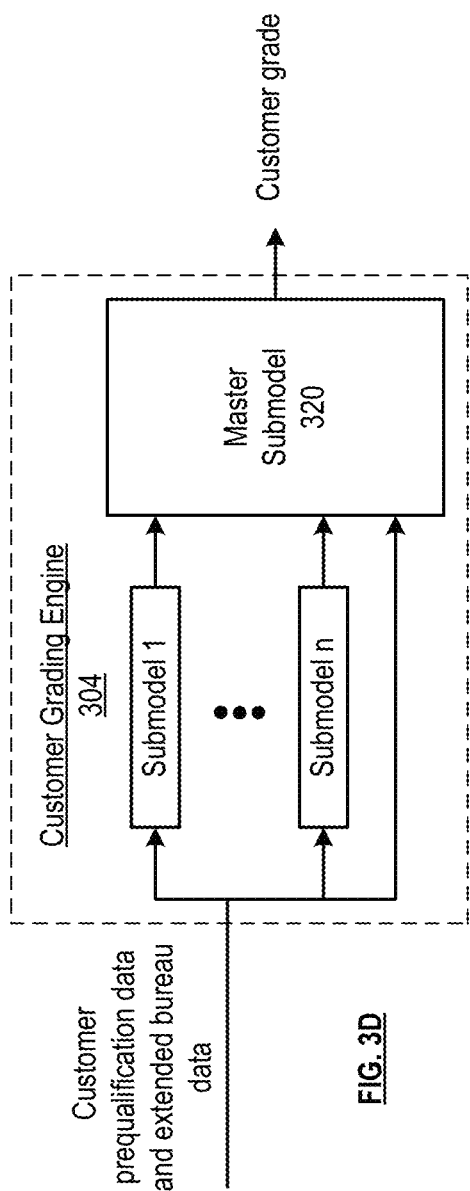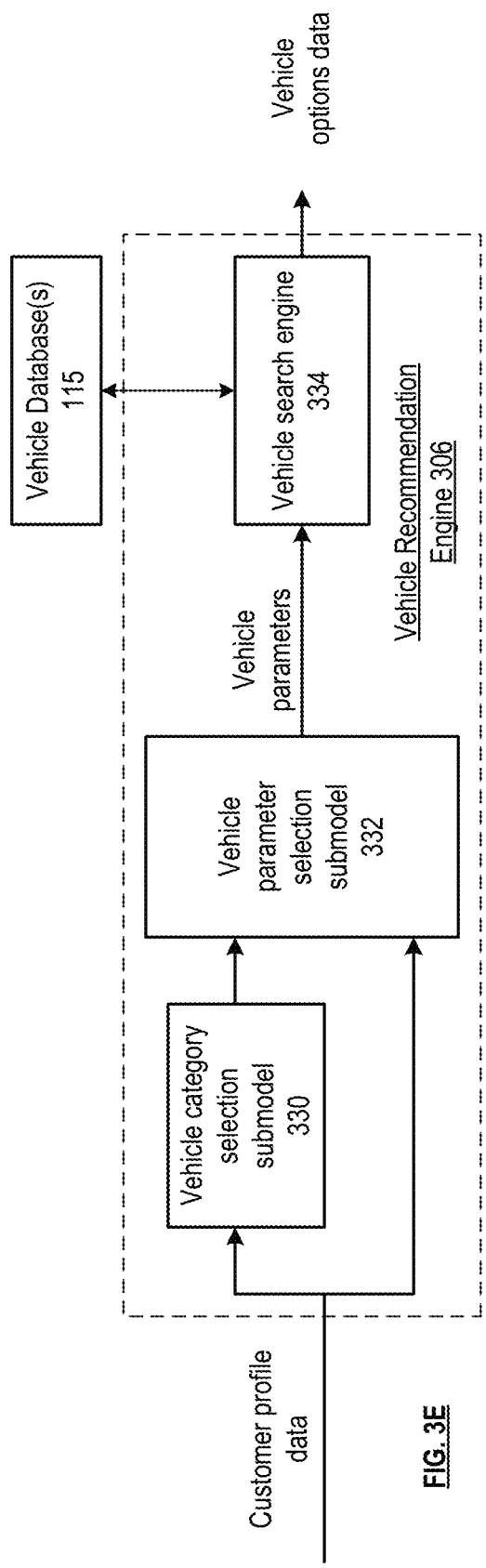

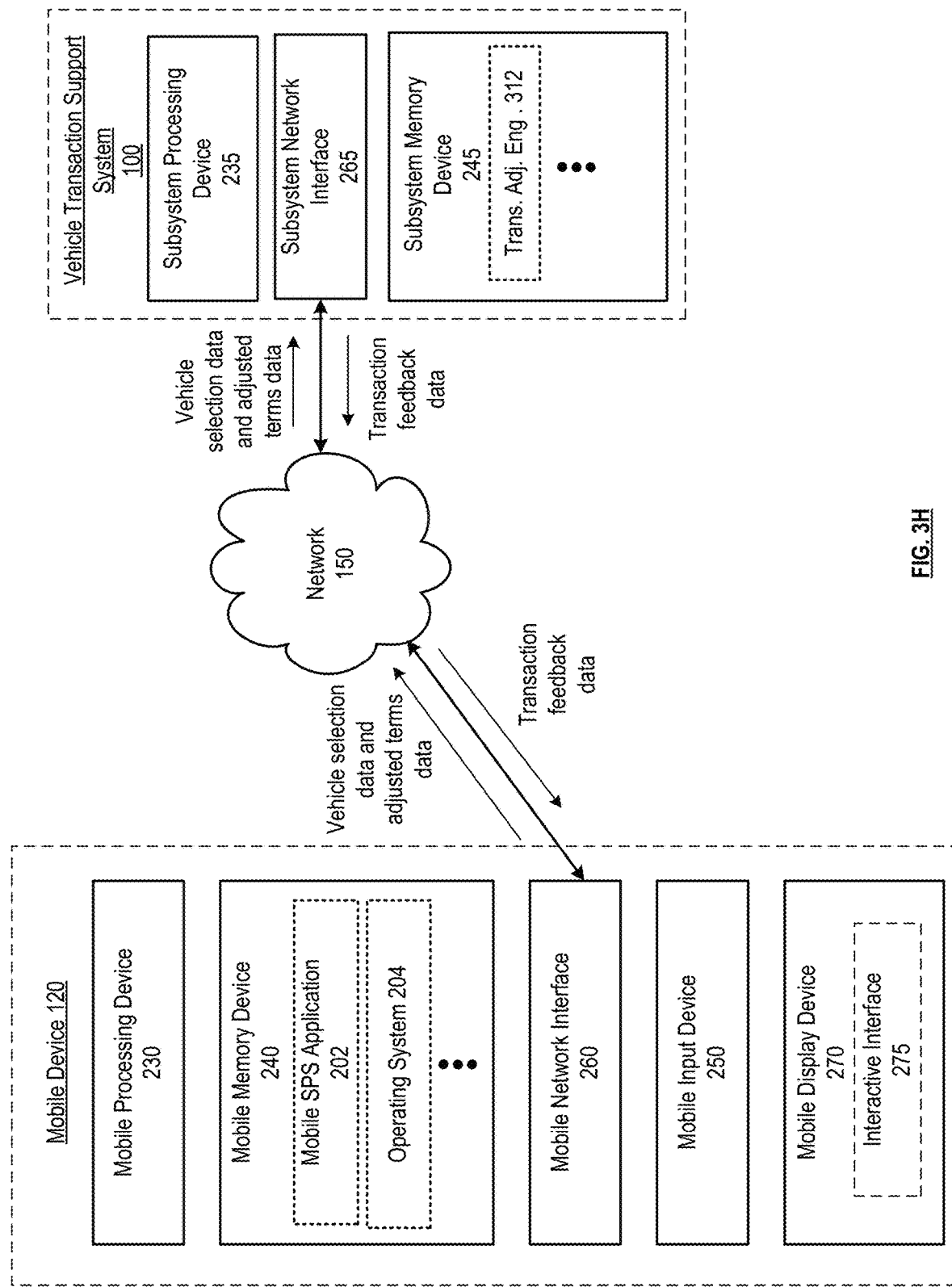

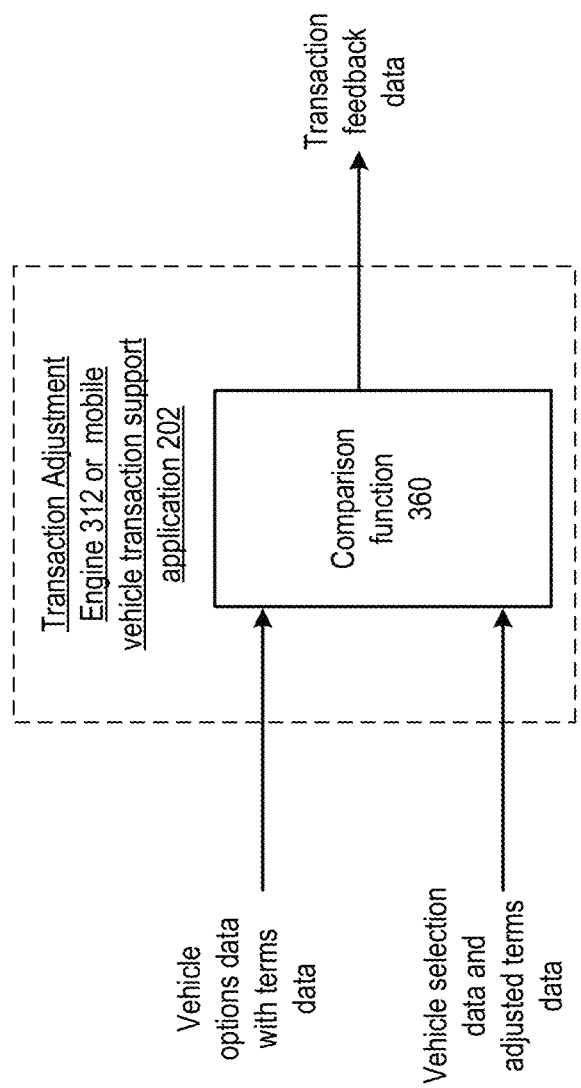

AI-BASED VEHICLE SUPPORT SYSTEM AND METHOD FOR USE THEREWITH

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND

Technical Field

This invention relates generally to artificial intelligence-based processing systems used in conjunction with client/server and other network architectures for supporting vehicle transactions.

Description of Related Art

BRIEF DESCRIPTION OF THE SEVERAL VIEWS OF THE DRAWING(S)

FIG. 1 is a schematic block diagram of an embodiment of a vehicle transaction support system;

FIG. 3D is a schematic block diagram of a customer grading engine in accordance with various embodiments;

FIG. 3E is a schematic block diagram of a customer recommendation engine in accordance with various embodiments;

FIG. 3H is a schematic block diagram of a vehicle transaction support system in accordance with various embodiments;

FIG. 3I is a schematic block diagram of a transaction adjustment engine in accordance with various embodiments;

DETAILED DESCRIPTION

Figure 2A:
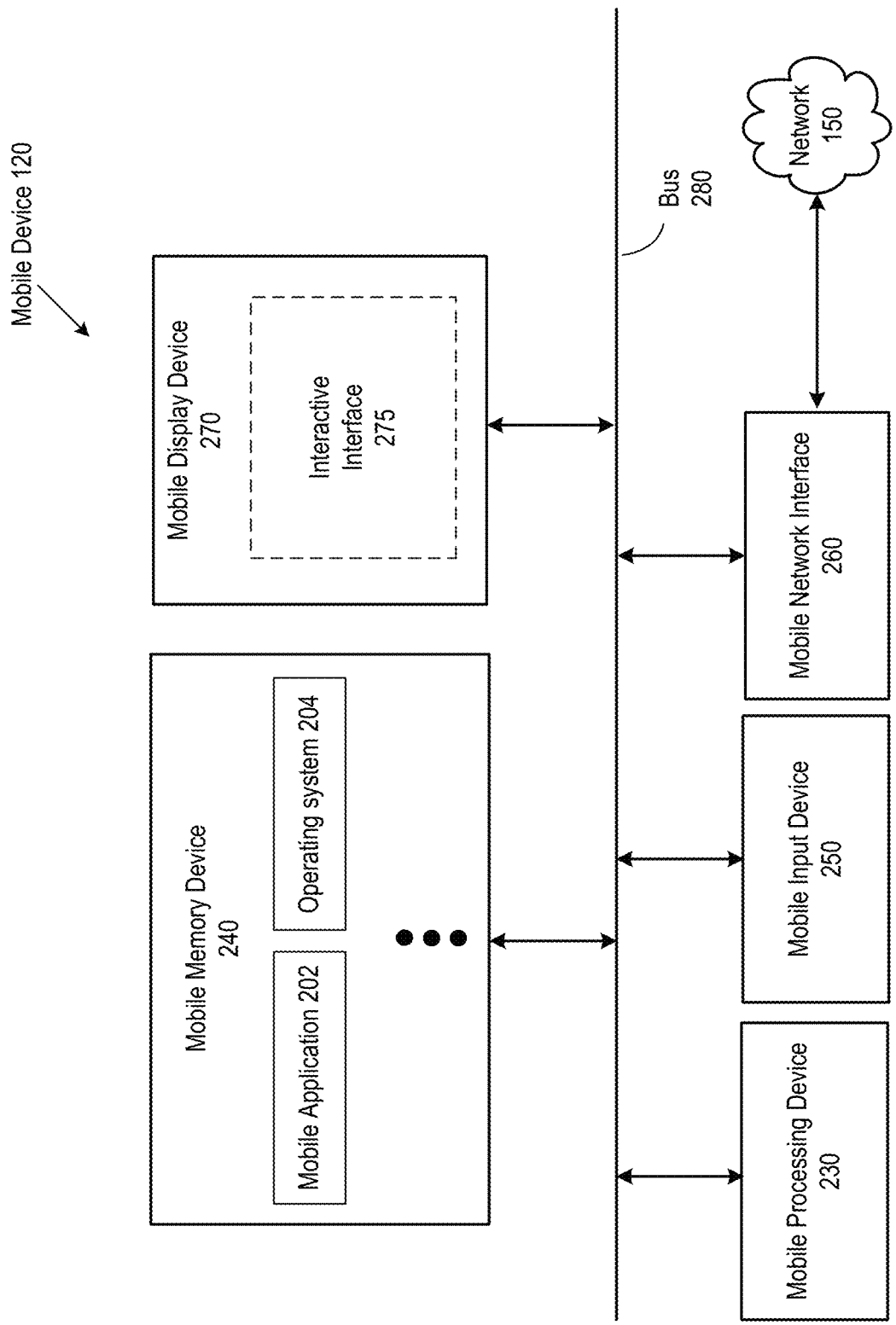
FIG. 2A is a schematic block diagram of a mobile device in accordance with various embodiments.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced without these details and without applying to any particular networked environment, computer architecture, processing system or standard.

FIG. 1 presents a vehicle transaction support system 100, which can include one or more support subsystems 101 that communicate bidirectionally with one or more mobile devices 120 via a wired and/or wireless network 150. The support subsystems 101 can include, for example, a pre-qualification subsystem 102, a customer grading subsystem 104, a vehicle selection subsystem 106, a transaction recommendation subsystem 108, a terms adjustment subsystem 110, an agent subsystem 112 and/or other support subsystems for providing automated vehicle transaction support to one or more customers, agents or other users. Some or all of the subsystems 101 can utilize the same processing devices, memory devices, and/or network interfaces, for example, running on a same server or other computing platform, set of cloud servers or other shared servers connected to network 150. Alternatively, or in addition, some or all of the subsystems 101 can be assigned their own processing devices, memory devices, and/or network interfaces, for example, running separately on different sets of servers connected to network 150. Some or all of the subsystems 101 can interact directly with each other, for example, where one subsystem's output is transmitted directly as input to another subsystem via a network connection. Network 150 can include one or more wireless, optical and/or wired communication systems; one or more non-public intranet systems and/or public Internet systems; and/or one or more local area networks (LAN) and/or wide area networks (WAN).

The vehicle transaction support system 100 can further include one or more vehicle databases 115 corresponding to, for example, one or more partner companies. Each vehicle database 115 can store one or more shared databases and/or one or more files stored on one or more memory devices that include vehicle information in the form of images, data fields, text, other media and/or other database entries as described herein. The shared databases and/or files can each be utilized by some or all of the subsystems of the vehicle transaction support system 100, allowing some or all of the subsystems 101 and/or mobile devices 120 to retrieve, review and/or process entries from the one or more vehicle databases 115.

One or more mobile devices 120 can each be associated with one or more agents or users of one or more subsystems 101 of the vehicle transaction support system 100. Some of the mobile devices 120 allowing agents, customers and/or other users to operate or otherwise operate the functions and features of one or more subsystems 101 for which they are authorized to access.

Some or all of the subsystems 101 of the vehicle transaction support system 100 can include a server that presents a website for operation via a browser of mobile devices 120. Alternatively or in addition, each mobile device 120 can store specific application data, a corresponding database and/or other data in a memory, data corresponding to some or all subsystems 101, for example, a subset of the subsystems 101 that are relevant to the user of the mobile device 120. A processor of the mobile device 120 can operate via a display device to display an interactive interface, such as a graphical user interface, based on instructions in the data stored in memory and/or received via the network 150. For example, a website implemented by a subsystem 101 can operate via the application. Some or all of the websites presented can correspond to multiple subsystems 101, for example, where the multiple subsystems share the server presenting the website.

Each subsystem 101 can be configured separately or on a combined basis with other subsystems 101 for user authentication such as two factor authentication, password authentication or other authentication to prohibit unauthorized access. In addition, the support subsystems 101, vehicle databases 115 and mobile device 120 can employ encryption, such as AES256 and/or other encryption algorithm to protect the security of data stored therein. Furthermore, the network 150 can be configured for secure communications between the support subsystems 101, the mobile devices 120 and the vehicle databases 115 to protect the security of data communicated between the support subsystems 101, the mobile devices 120 and the vehicle databases 115.

In general, some or all of these functions discussed herein cannot be practically be trained by the human mind. Instead, such functions and/or corresponding models can be trained based on applying artificial intelligence algorithms and/or techniques, and/or machine learning algorithms and/or techniques, to a training set of feature vectors and/or document files. Alternatively or in addition, training some or all medical scan analysis functions cannot be practically be trained by the human mind based upon: a great complexity of the resulting function and/or corresponding model; a large size of the training set utilized to train the function and/or model; the model taking an infeasibly long amount of time to train utilizing only pen and paper; and/or other reasons. Some or all of these functions discussed herein cannot be practically be performed by the human mind. Instead, such functions can be performed utilizing artificial intelligence algorithms and/or techniques, and/or machine learning algorithms and/or techniques. Alternatively or in addition, such functions can be performed utilizing a model trained utilizing artificial intelligence algorithms and/or techniques, and/ or machine learning algorithms and/or techniques. Alternatively or in addition, performing some or all functions cannot be practically be performed by the human mind based upon: a great complexity of these function; an accuracy rate and/or consistency of generating output being more favorable than that of a human; a speed of generating output being more favorable than that of a human; these functions taking an infeasibly long amount of time to perform utilizing only pen and paper; and/or other reasons.

In operation, the vehicle transaction support system 100 operates in conjunction with mobile devices 120 such as tablets or mobile phones to guide agents, customers and/or other users. The vehicle transaction support system 100 utilizes an artificial intelligence (AI) based grading process that is trained based on vast amounts of data representing the results of tens of thousands (or more) prior vehicle transactions. The AI model operates based on dozens of inputs (or more) from customers to produce a unique customer profile and customer prequalification data that can be used to produce a "Grade" for a customer that is different from a traditional, general and commercially available credit score. This customer grade, for example, can be used to supplement a traditional credit score and/or in place of a traditional credit score in circumstances where a customer lacks such a score—to determine a more accurate likelihood of transaction default. The vehicle transaction support system 100 improves the technology of automated credit scoring using AI models that improve the speed, consistency and accuracy of grade calculations. Furthermore, the human mind is not equipped to operate or train such AI models given the vast volume of training data and the machine, i.e., non-human learning required to perform such operation and training.

In various embodiments, the vehicle transaction support system 100 utilizes further AI models that are trained on vast training data sets representing the results of tens of thousands (or more) prior vehicle transactions to recommend vehicle selections to a customer and further to determine a customer's eligibility for loan value, term, interest rate and down payment, etc. In this fashion, the AI models can support operates where vehicles and terms can be matched to a customer's needs and particular circumstances. The vehicle transaction support system 100 improves the technology of automated vehicle and transaction term selection using AI models that improve the speed and accuracy of such predictions. Once again, the human mind is not equipped to train such AI models given the vast volume of training data and the machine, i.e., non-human learning required to perform such operation and training.

In particular, generating one or more of the various types of data described herein for a given user is performed on an automated basis based on the various AI functions described herein within a short time frame (such as less than a millisecond, less than 100 milliseconds, less than a second, less than a minute). These functions cannot feasibly be performed by the human mind, for example based upon: the human mind not being able to feasibly perform one or more given functions within the short time frame with an accuracy of output and/or consistency of output attained by the vehicle transaction support system 100; the human mind not being able to feasibly perform one or more given functions within the short time frame due to the computational complexity of performing these functions; the human mind not being able to feasibly perform one or more given functions within the short time frame due to processing complexity of processing a large required amount of input data to each function, such as a large number of responses and/or large amount of text and/or image data being processed; the human mind not being able to feasibly perform one or more given functions within the short time frame due to searching for and/or retrieval of the appropriate input data from a large amount data, such as hundreds, thousands, and/or millions of different data elements; the human mind not being able one or more given functions within the short time frame utilizing only pen and paper; the human mind not being able to feasibly generate one or more of the various data described herein within the same short time frame utilizing only pen and paper; and/or other reasons.

Further examples including many optional functions and features of the vehicle transaction support system 100 are described in conjunction with the Figures that follow.

FIG. 2A presents an embodiment of mobile device 120. Each mobile device 120 can include one or more mobile processing devices 230 that each include a processing circuit, one or more mobile memory devices 240, one or more mobile input devices 250, one or more mobile network interfaces 260 operable to more support one or more communication links via the network 150 indirectly and/or directly, and/or one or more client display devices 270, connected via bus 280. While a particular bus structure is shown for purposes of illustration in a block diagram, other structures including multiple buses and/or direct connections between functional blocks. Mobile application 202 can interact with one or more of the subsystems 102, 104, 106, 108, 110 and/or 112 of the vehicle transaction support system 100. Each mobile device 120 can receive the application data from a corresponding subsystem 101 via network 150 by utilizing network interface 260, for storage in the one or more memory devices 240. In various embodiments, some or all mobile devices 120 can include a computing device associated with a user of one or more subsystems 101 as described herein.

In various embodiments, the memory device 240 can store executable instructions included in an operating system 204, mobile application 202 and/or other application, utility or routine, that, when executed by the processing device 230, facilitate the performance of the operations by the mobile device 120. In particular, the one or more processing devices 230 can generate an interactive interface 275 on the one or more mobile display devices 270 in accordance with the mobile application 202. The user can provide input in response to menu data, selectable links, prompts and/or other media presented by the interactive interface via the one or more client input devices 250. The client input devices 250 can include a microphone, mouse, keyboard, touchscreen of display device 270 itself or other touchscreen, and/or other device allowing the user to interact with the interactive interface 275. The one or more processing devices 230 can process data and/or send raw or processed data to the corresponding subsystem 101, and/or can receive and/or generate new data in response for presentation via the interactive interface 275 accordingly, utilizing network interface 260 to communicate bidirectionally with one or more subsystems 101 and/or or other systems via the network 150.

Figure 2B:
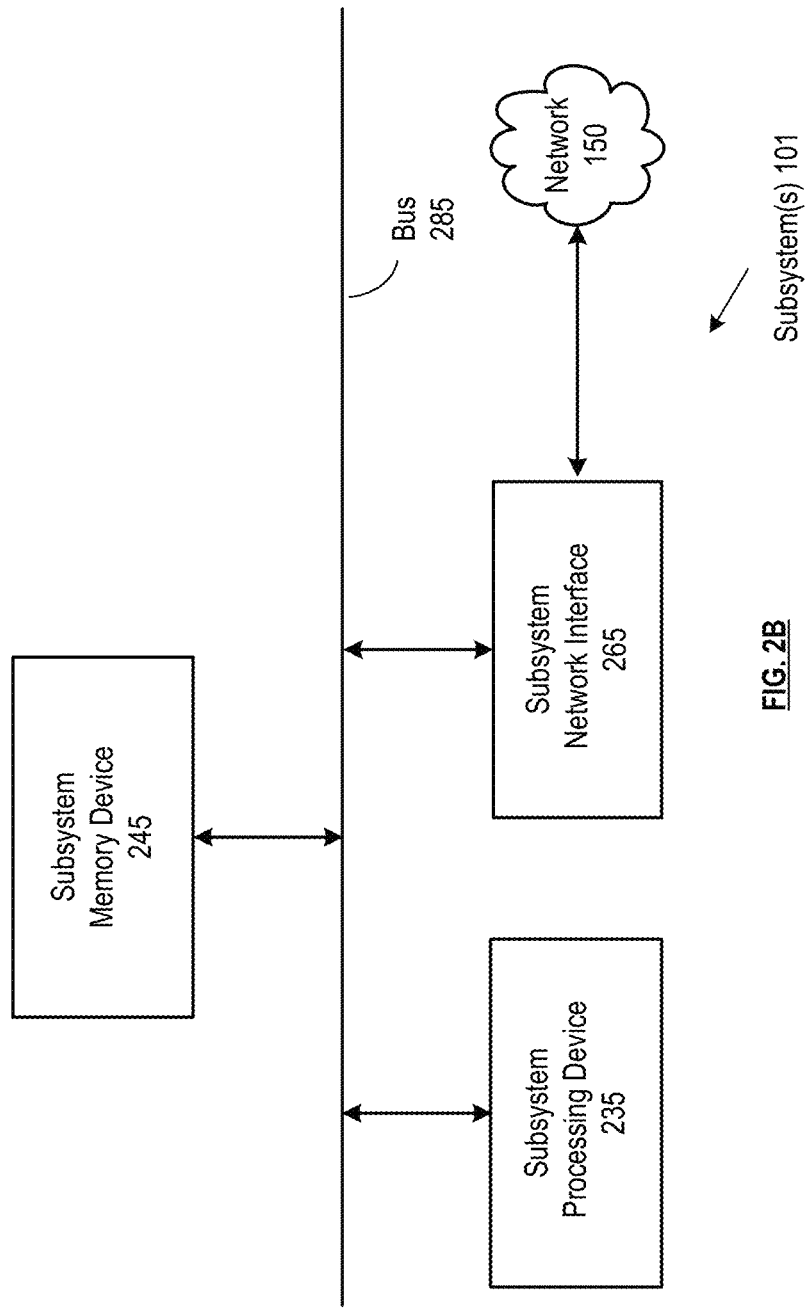
FIG. 2B is a schematic block diagram of one or more support subsystems in accordance with various embodiments.

FIG. 2B presents an embodiment of one or more subsystems 101, which can be utilized in conjunction with subsystem 102, 104, 106, 108, 110 and/or 112. The subsystem(s) 101 can include, individually or collectively, one or more subsystem processing devices 235 that each include a processing circuit, one or more subsystem memory devices 245, and/or one or more subsystem network interfaces 265, connected via bus 285. While a particular bus structure is shown for purposes of illustration in a block diagram, other structures including multiple buses and/or direct connections between functional blocks. The subsystem memory devices 245 can store executable instructions that, when executed by the one or more subsystem processing devices 235, facilitate the performance of operations by the subsystems 101, as described for each subsystem herein.

Figure 3A:
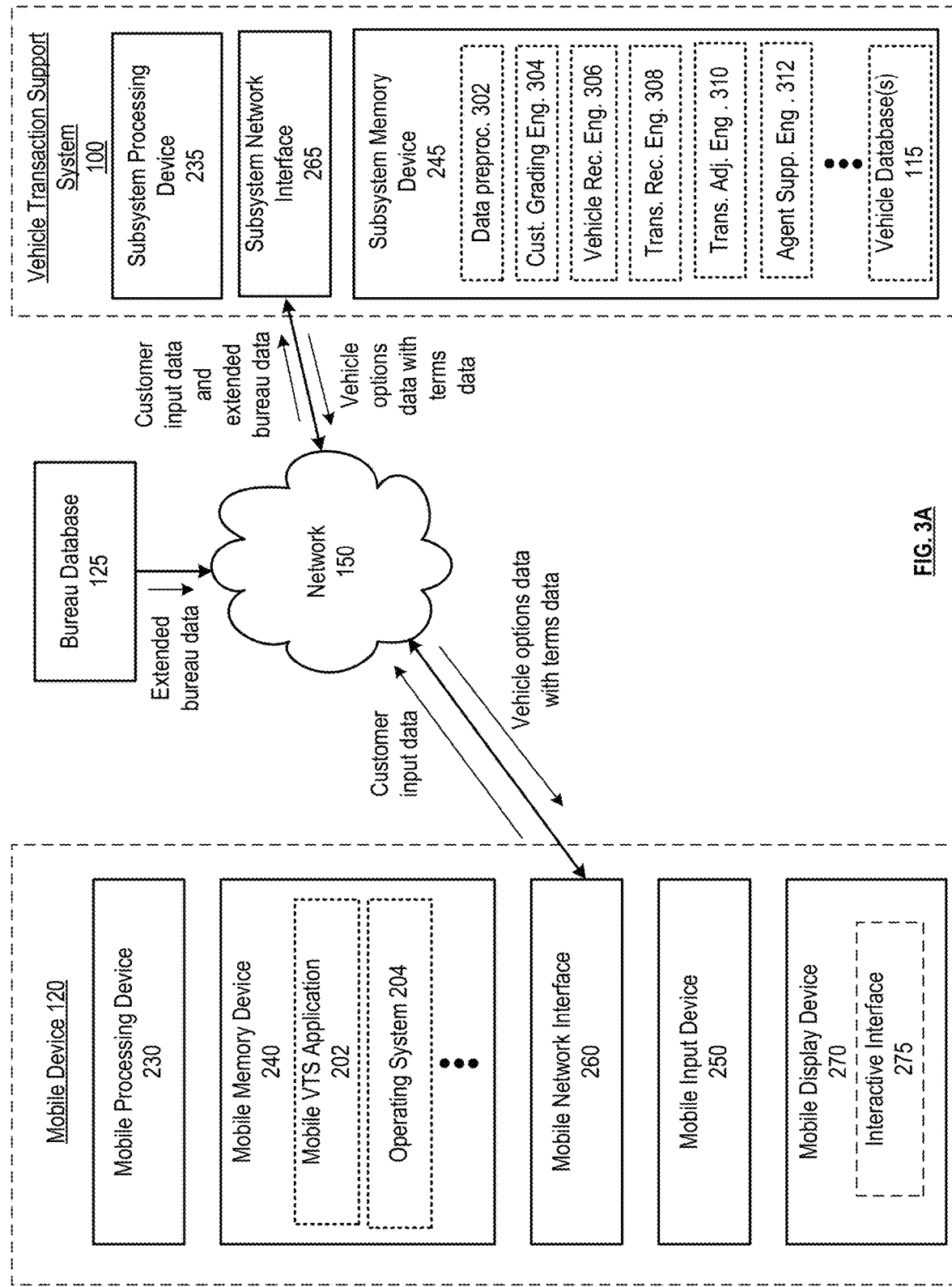
FIG. 3A is a schematic block diagram of a vehicle transaction support system in accordance with various embodiments.

FIG. 3A is a schematic block diagram of a vehicle transaction support system in accordance with various embodiments. In particular, a vehicle transaction support system 100 is presented that includes a subsystem processing device 235, subsystem network interface 265, and subsystems memory device 245 that support the operation of subsystem 102, 104, 106, 108, 110 and/or 112 and one or more mobile devices 120. In particular, the subsystem memory device 245 of vehicle transaction support system 100 stores instructions to execute a data preprocessor 302, a customer grading engine 304, a vehicle recommendation engine 306, a transaction recommendation engine 308, a transaction adjustment engine 310, an agent support engine 312 and also stores one or more vehicle databases 115 to provide the functionality, for example, of the prequalification subsystem 102, the customer grading subsystem 104, the vehicle selection subsystem 106, the transaction recommendation subsystem 108, the terms adjustment subsystem 110, the agent subsystem 112 and/or other support subsystems for providing automated vehicle transaction support to one or more customers or agents via the mobile device 120. While shown as being implemented as a single platform with a single subsystem processing device 235, single subsystem network interface 265, and single subsystems memory 245, any combinations of subsets of the subsystems 101 can be implemented via separate platforms each having their own subsystem processing device 235, subsystem network interface 265, and subsystem memory 245.

The mobile device 120 executes the mobile vehicle transaction support application 202 in conjunction with an operating system 204 or other general purpose application, a communication application and/or a special purpose mobile application to bidirectionally communicate data over network 150 via the mobile network interface 260, to provide the interactive interface 275 for display via the mobile display device 270. When executed via the mobile processing device 230, the mobile vehicle transaction support application 202 interacts with the vehicle transaction support system 100 to provide the various functions and features described herein. In particular, the mobile vehicle transaction support application 202 and the vehicle transaction support system 100 cooperate, permitting user(s) of mobile device(s) 120, such as customers and agents to utilize the vehicle transaction support system 100. It should be noted that this cooperation can include functions solely performed by the mobile device 120, functions performed solely by the vehicle transaction support system 100 and functions performed jointly via both devices. Furthermore, some or all of the functions attributed to the vehicle transaction support system 100 can be incorporated in the mobile device 120 and/or performed by the mobile vehicle transaction support application 202, operating system 204 or other application, utility or routine.

Figure 3B:
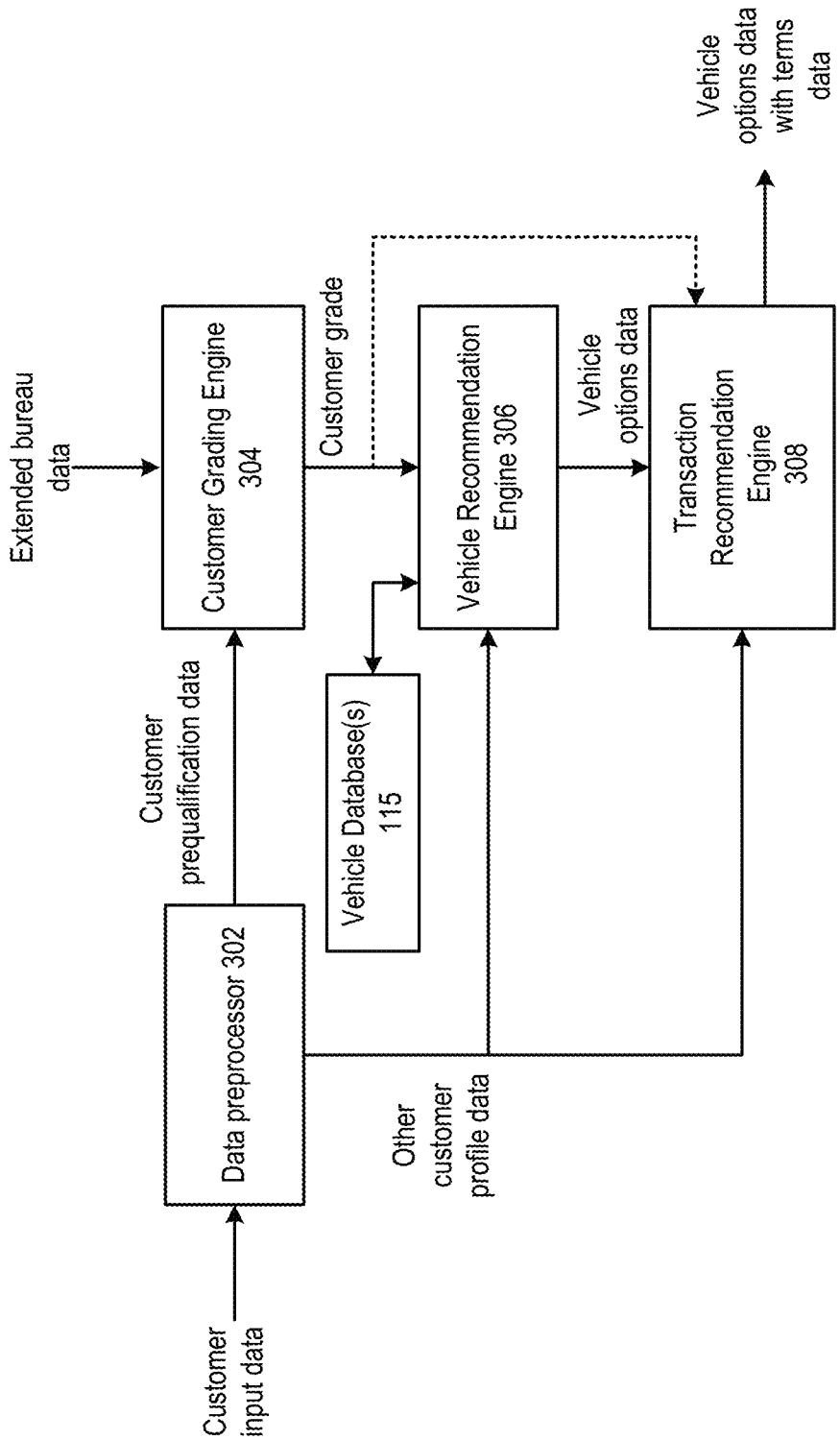
FIG. 3B is a flow diagram in accordance with various embodiments.

Several functions performed by the vehicle transaction support system 100 can be described in conjunction with FIG. 3B which presents a flow diagram in accordance with various embodiments. These functions include:

Receiving, via the data preprocessor 302, customer input data generated via customer interaction with a graphical user interface of a mobile device and generating customer prequalification data and other customer profile data from the customer input data;

Generating, based on the customer prequalification data and/or extended bureau data and utilizing a customer grading engine 304 having an artificial intelligence model trained via machine learning, a customer grade that predicts a likelihood of transaction default associated with a customer;

Generating, based on customer profile data that includes the customer grade and the other customer profile data and utilizing a vehicle recommendation engine 306 having an artificial intelligence model trained via machine learning, vehicle options data that indicate particular vehicles selected from the vehicle database 115; and Generating, based on at least a portion of the customer profile data (that may include the customer grade) and the vehicle options data and utilizing a transaction recommendation engine 308 having a third artificial intelligence model trained via machine learning, terms data associated with each of the vehicles selected from the vehicle database.

For example, the customer prequalification data includes, if available, logical, text and/or numerical values associated with any of the criteria indicated below in Table 1 below:

TABLE 1

Lived in US (years),
FICO or other commercial credit score,
Residence Type,
Length of Residence (months),
Length of Employment,
Length of Previous Employment,
Current Insurance,
Current Transportation,
Prior Credit,
Unsatisfied Judgments (amount),
Repossession (years ago),
Application Month, In various embodiments, the extended bureau data includes, for example, customer data received from a credit bureau that is different and separate from a traditional credit score, such as a FICO® credit score, VantageScore®, Lexis Nexis® score, Experian® score, Equifax® score, Transunion® score or other commercially credit score, but instead includes data such as credit bureau or other bureau data indicating more specific customer metrics such as customer identifying data, credit account data, credit inquiry data, public records data, etc. Examples of the extended bureau include logical, text and/or numerical values associated with any of the criteria indicated below in Table 2 below:

TABLE 2

Age Oldest Record,
Phone Age Oldest Record,
Current Address Age Oldest Record,
Lien Filed Total,
Previous Address Last Sales Price,
Phone Age Newest Record,
Address Recent Economic Trajectory,
Professional License Type,
Subject Phone Recent Count,
Phone Other Age Newest Record,
Address Recent Economic Trajectory 2,
Input Address Affordable Market Value,
SSN Issue State,
Previous Address Age Last Sale, In various embodiments, the other customer profile data includes, for example, any or all of the customer prequalification data and also, if available, logical, text and/or numerical values associated with any of the criteria indicated below in Table 3 below:

TABLE 3

Household Size,
Dependents Under 18,
Driver's License Years,
Financed Vehicles Before,
Current Transportation,
Length of Residence (months),
Lived in US (years),
Savings,
Full Time Jobs,
FICO score,
Length of Employment,
Children,
Application Month,
Age,
Marital Status,
Length of Previous Employment, TABLE 3-continued Part Time Jobs
Cell Phone Type,
Other ID Type,
Ups Count,
Checking Account,
Employment Status,
Current Debt Balance,
No. of Phones,
Adults living in Residence,
Down Payment Coming From,
Residence Type,
Monthly Miles,
Current Insurance,
Type of Work,
State,
Income Pay Mode,
Passport Country,
Born in US,
Dependents over 18,
Residence zip code Furthermore, the customer profile data can include any or all of the other customer profile data and/or the customer grade and further information included in customer input data and/or additional extended bureau data. It should be noted that Tables 1, 2 and 3 present merely examples of data fields and that other types of data can be used, in addition or in the alternative to the data fields shown.

In various embodiments, the operations of the vehicle transaction support system 100 can further include:
sending the vehicle options data and terms data for display via the graphical user interface of a mobile device;
obtaining updated terms data generated via customer interaction with the graphical user interface;
comparing the updated terms data to term limits data;
generating transaction feedback data indicating acceptance of the updated terms for display via the graphical user interface, when the updated terms data compare favorably to the term limits data; and generating transaction feedback data indicating rejection of the updated terms for display via the graphical user interface, when the updated terms data compare unfavorably to the term limits data.

Figure 3C:
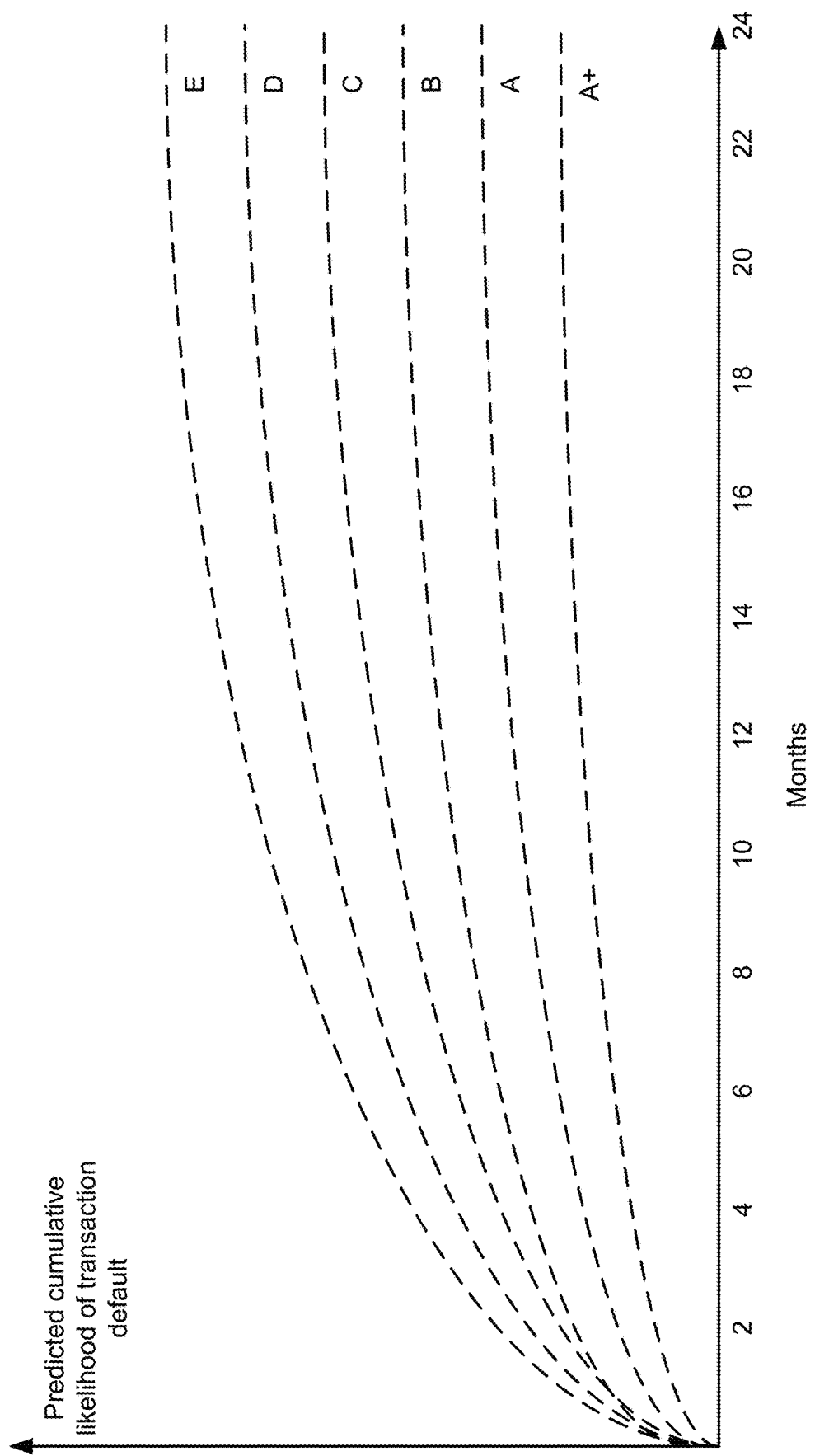
FIG. 3C is a graphic diagram of predicted cumulative likelihood of transaction default in accordance with various embodiments.

FIG. 3C is a graphic diagram of predicted cumulative likelihood of transaction default in accordance with various embodiments. As previously discussed, the customer grading engine 306 generates a customer grade that predicts a likelihood of transaction default associated with a customer. In the example shown, the customer grade determined as one of a plurality of discrete values [A+, A, B, C, D, E] based on a predicted cumulative likelihood of transaction default over a predetermined term, such as 6, 12, 24 months or some over value. With this metric, A+ is the most desirable grade and E is the least desirable grade.

In operation, the cumulative likelihood of transaction default is predicted by the AI model of the customer grading engine 306 as either a discrete value corresponding to one of the plurality of discrete values or as an numerical score that is fit to the closest one of the plurality of discrete values to generate the customer grade. While a particular customer grading metric is shown, customer grades corresponding to other metrics proportional to, corresponding to, indicating and/or otherwise associated with the likelihood of transaction default could likewise be employed.

FIG. 3D is a schematic block diagram of a customer grading engine in accordance with various embodiments. In the example shown, the AI model of the customer grading engine 304 is an ensemble model that includes n auto sub-models configured to process the customer prequalification data and the extended bureau data and furthermore a master sub-model configured to generate the customer grade by processing the customer prequalification data and the extended bureau data together with outputs of the n sub-models.

An autoencoder is a type of artificial neural network used to learn efficient data codings in an unsupervised manner. The aim of an autoencoder is to learn a representation (encoding) for a set of data, by training the network to ignore signal "noise". Along with the reduction side, a reconstructing side is learnt, where the autoencoder tries to generate from the reduced encoding a representation as close as possible to its original input, hence its name. By learning to replicate the most salient features in the training data set under some of the constraints described previously, the model is encouraged to learn how to precisely reproduce the most frequent characteristics of the observations. When facing anomalies, the model should worsen its reconstruction performance. In most cases, only data with normal instances are used to train the autoencoder; in others, the frequency of anomalies is so small compared to the whole population of observations, that its contribution to the representation learnt by the model could be ignored. After training, autoencoder operates to reconstruct normal data very well, while failing to do so with anomaly data which the autoencoder has not encountered. Reconstruction error of a data point, which is the error between the original data point and its low dimensional reconstruction, is used as an anomaly score to detect anomalies.

In various embodiments, the sub-models are implemented via autoencoders trained to distinguish input data, e.g., customer prequalification data and extended bureau data, indicating no default from detected anomalies indicating potential default. The following steps can be utilized to train these autoencoders:

Reference data, e.g., historical customer prequalification data and extended bureau data, is split into a training data and a validation data set. Only accounts without a default are selected to train the auto encoders. This is done to enable the network to learn the salient features of the good accounts and produce a large abnormality signal when scoring bad accounts.

A large set of neural network setups (10, 25, 50, 100 or more) are tested, along with associated hyper parameters of training steps.

The top n neural networks are selected as the n sub-models based on the performance of the models on the training and validation dataset. For example, n can be equal to an integer value such as 2, 3, 4, 5, 6, 7, 8 . . . , however greater values can be used in more complex implementations.

In various embodiments, the master sub-model 320 is implemented via an optimized distributed gradient boosting AI model, such as an XGBoost library designed to be highly efficient, flexible and portable. For example, the master sub-model 320 can provide a parallel tree boosting that solves for the customer grade problems in a fast and accurate way.

The master sub-model 320 can be trained as follows:

The input data, e.g., customer prequalification data and extended bureau data, is passed through n sub-models described above and their respective outputs are appended to the reference data.

Reference data e.g., historical customer prequalification data and extended bureau data, is split into training data and validation data.

A large set of hyper parameters for the master sub-model 320 are tested, such as:
   a. Learning rate
   b. Subsample
   c. Colsample_bytree
   d. Number of estimators
   e. Max depth
   f. Gamma
   g. Min. child weight
   h. Etc.

Performance of each candidate master sub-model 320 is evaluated on training and validation samples. The model which shows the most stability across training and validation with high Kolmogorov-Smirnov (KS) and receiver operating characteristic (ROC) metrics is selected.

FIG. 3E is a schematic block diagram of a customer recommendation engine in accordance with various embodiments. In the example shown, the AI model of the customer recommendation engine 306 is an ensemble model that includes: a vehicle category selection sub-model 330 a vehicle parameter selection sub-model 332 and a vehicle search engine 334. The vehicle database(s) 115 store vehicle data associated a number of vehicles of various categories, ages, mileage, prices or price ranges etc., that are available for sale.

The vehicle category selection sub-model 330 is configured to generate one or more selected vehicle categories from of a plurality of vehicle categories based on the customer profile data including, for example, the customer grade. It should be noted that the customer grade could be generated by the customer grading engine 304 or some default parameter such as an C or E grade if prequalification has not occurred. The function of the vehicle category selection sub-model 330 is to generate a prediction the category of vehicle user may wish to buy.

In various embodiments, the vehicle category selection sub-model 330 is implemented via an optimized distributed gradient boosting AI model, such as an XGBoost library designed to be highly efficient, flexible and portable. The vehicle category selection sub-model 330 can be trained as follows:

Reference data, e.g., historical customer profile data along with actual vehicle category selections, is split into training data and validation data.

A large set of hyper parameters for the vehicle parameter selection sub-model 332 are tested, such as:
   i. Learning rate
   j. Subsample
   k. Colsample_bytree
   l. Number of estimators
   m. Max depth
   n. Gamma
   o. Min. child weight
   p. Etc.

Performance of each candidate vehicle category selection sub-model 330 is evaluated based on training and validation samples representing historical customer category selections. The model which shows the most stability across training and validation with high Kolmogorov-Smirnov (KS) and receiver operating characteristic (ROC) metrics is selected.

The vehicle parameter selection sub-model 332 is configured to generate a plurality of vehicle parameters for the selected vehicle category based on the customer profile data and the customer grade. For example, the vehicle parameters can include a vehicle category such as large truck, small truck, sport utility vehicle (SUV), vehicle price or price range, vehicle mileage, vehicle age, etc. In various embodiments, the vehicle parameter selection sub-model 332 is implemented via an information filtering system such as a collaborative filter that seeks to predict the "rating" or "preference" a user would give to a category of vehicle. In various embodiments, the vehicle parameter selection sub-model 332 identifies similar vehicles selected by similar users based on training data that includes historical sales records and generates vehicle parameters corresponding to these similar vehicles.

The following steps can be used to train the vehicle parameter selection sub-model 332:

Reference data, e.g., historical customer profile data and/or customer grade along with along with actual vehicle category selections, is scored through the vehicle category selection sub-model 330 described above and the top m categories are estimated for each record, where m=3, 4, 5 or higher.

Reference data, e.g. vehicles selected by past customers along with their customer profile data and/or customer grade, is split into training data and validation.

A collaborative filter is trained using the customer profile data of the customers, historical purchase decisions and predicted categories.

Performance of the model is evaluated on training and validation samples. The candidate model which shows most stability across the training and validation is selected.

The vehicle search engine 334 is configured to generate vehicle options data indicating a set of selected vehicles based on a search the vehicle database(s) 115 for vehicles having corresponding vehicle data that compares favorably to the vehicle parameters. Database search techniques can be used to select p, a predetermine number, of vehicles—that have the greatest match to the vehicle parameters. Otherwise, database search techniques can be used to select all vehicles that match the vehicle parameters within a predetermined tolerance.

Figure 3F:
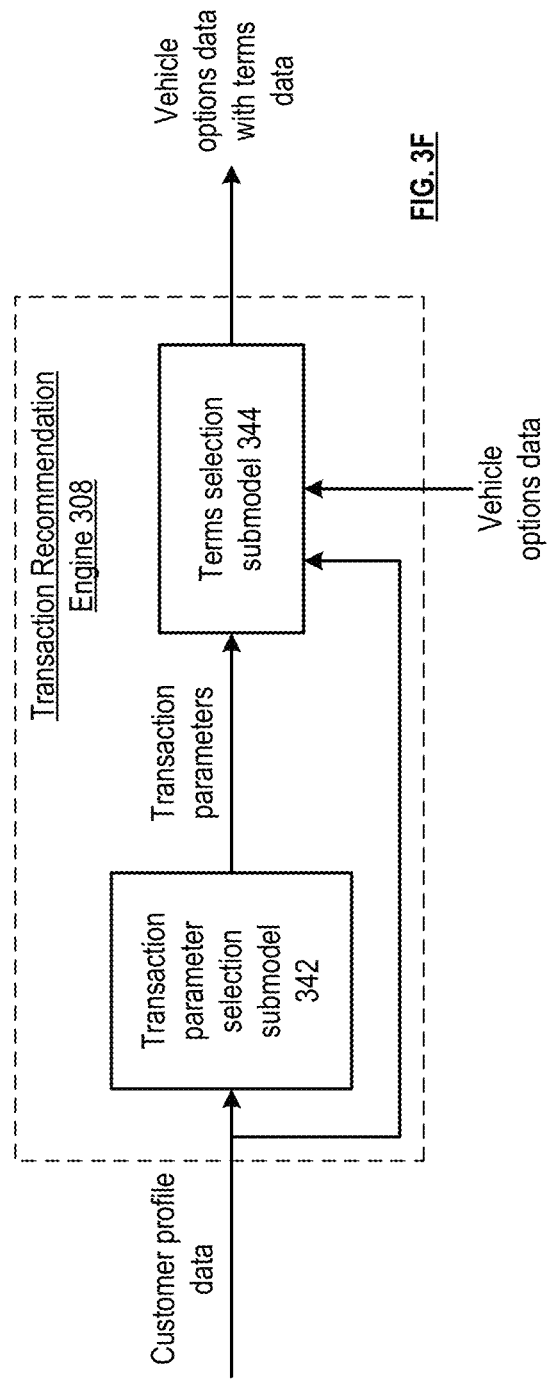
FIG. 3F is a schematic block diagram of a transaction recommendation engine in accordance with various embodiments.

FIG. 3F is a schematic block diagram of a transaction recommendation engine in accordance with various embodiments. In the example shown, the AI model of the transaction recommendation engine 308 is an ensemble model that includes a transaction parameter selection sub-model 342 and a terms selection sub-model 344. The transaction parameter selection sub-model 342 is configured to generate, based on the customer profile data, transaction parameters that indicate a collection/pool of deal terms predicted for acceptance—sets of deal terms each characterized by, for example, down payments, minimum down payments, weekly, biweekly or monthly payment amounts, interest rates, the number of term months and/or the maximum number of term months, predicted for the customer. In various embodiments, the transaction parameter selection sub-model 342 is implemented via an information filtering system such as a collaborative filter that seeks to predict the "rating" or "preference" a user would give to a particular set of deal terms. In various embodiments, the transaction parameter selection sub-model 342 identifies a collection/set of transaction parameters (e.g., a pool of deal terms) based on a collaborative filtering based on historical sales records for similar customers filtered for non-defaulting accounts. This is done to improve the risk profile of the recommended deals terms that have a high likelihood to book.

The terms selection sub-model 344 is configured to generate, based on the transaction parameters and the vehicle options data, the terms data associated with each of the vehicles selected from the vehicle database 115. For example, the terms selection sub-model 344 scores the deal terms indicated by the transaction parameters using an NPV model for cash flow estimation. The deals are then ranked ordered and top q, a predetermined number of deals or including both selected vehicles and corresponding deal terms, to be presented to the customer. In the alternative, all deals having scores that exceed a score threshold can be presented to the customer.

Figure 3G:
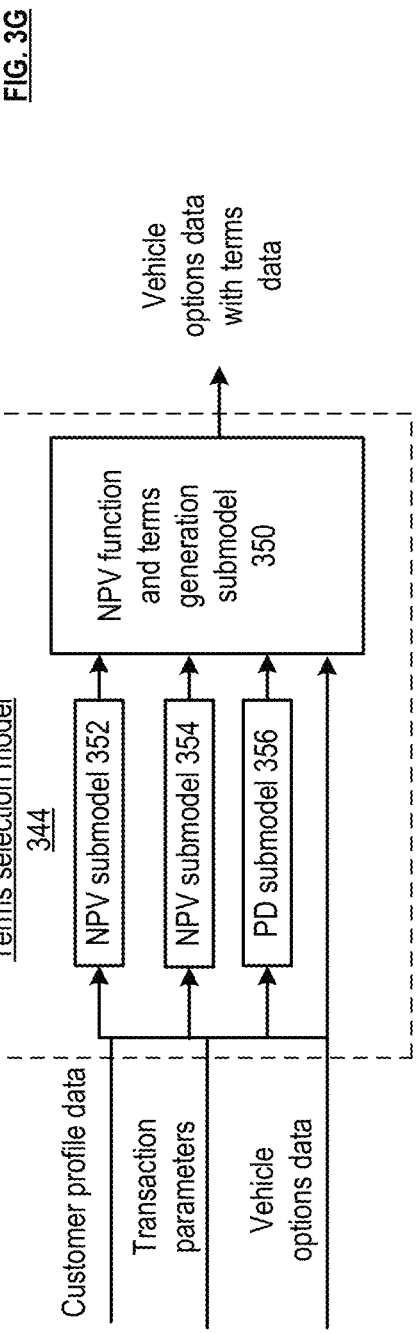
FIG. 3G is a schematic block diagram of a terms selection model in accordance with various embodiments.

An example implementation of the terms selection model 344 is presented in conjunction with FIG. 3G that follows. In the example shown, terms selection model 344 is itself an ensemble AI model that includes: net present value (NPV) sub-models 352 and 354, a probability of default (PD) sub-model 356 and an NPV function and terms generation model 350.

In various embodiments, the NPV sub-model 352 is trained to generate, based on the customer profile, the transaction parameters, and the vehicle options data, a net present value based on historical data representing non-defaulting transactions. The NPV sub-model 346 is trained to generate, based on the customer profile data, the transaction parameters, and the vehicle options data, a net present value based on historical data representing defaulting transactions. The PD sub-model 356 is trained to generate, based on the customer profile data, the transaction parameters, and the vehicle options data, the probability of default. The net present value function and terms generation sub-model 350 is configured to generate the terms data associated with each of the vehicles selected from the vehicle database, based on outputs from the NPV sub-model 352, the NPV sub-model 354 and the NPV sub-model 356. For example, the net present value (NPV) sub-models 352 and 354 predict two separate NPVs, one trained based on non-defaulted training data and the other trained based on defaulted training data. The NPV sub-models 352 and 354 can be implemented, for example, via Kernel Ridge Regression, XGBoost regression, Lasso, Elastic Net, and/or other AI model that is normalized based on deal NPV ratios calculated using the following formula:

$$NPV\_ratio=deal\_npv/(Sales\ Price-Total\ Down\ Payment)$$

where the sales price is gathered for a selected vehicle indicated by the vehicle options data and total down payment indicated by the transaction parameters. These two NPV sub-models 352 and 354 generate respectively two values, NPV_non-defaulted and NPV_defaulted, based on customer profile data, the pool of deal terms indicated by the transaction parameters and the vehicle options data representing the vehicle selected from the vehicle database(s) 115.

The PD sub-model 356, for example, can be implemented similarly to the customer grading engine 304, but also trained on a training data that indicates deal terms and further including historical data both with and without a traditional credit score. In operation, the PD sub-model 356 uses the pool of deal terms indicated by the transaction parameters, in addition to the customer profile data to generate a PD value that is indicative of the likelihood of transaction default.

The NPV function and terms generation sub-model 350 generates, for each vehicle selection indicated by the transaction terms, a final NPV value that can, for example, be calculated as follows:

Final_NPV=(NPV_non-defaulted*(1−PD_value))+
(NPV_defaulted*PD_value)

The deals can then be ranked ordered based on the top r final NPVs or the group of final NPVs that are above an acceptable final NPV threshold. In addition or in the alternative, the required down payment can be calculated as, for example:

Down_Payment=Sales Price−Final_NPV

The terms data indicates, for each selected vehicle, the corresponding final deal terms generated in the fashion. For example, this terms data can indicate, for each selected vehicle indicated by the vehicle options data, a minimum down payment such as Down_Payment, a recommended down payment, a maximum number of term months, a recommended number of term months, an annual percentage rate (APR) or other indicator of interest rate and/or a weekly, biweekly or monthly payment amount.

FIG. 3H is a schematic block diagram of a vehicle transaction support system in accordance with various embodiments. As previously discussed, the operations of the vehicle transaction support system 100 can further include:
- obtaining vehicle selection data and updated terms data generated via customer interaction with a graphical user interface (GUI), such as interactive interface 275 of mobile device 120;
- comparing the updated terms data to term limits data;
- generating transaction feedback data indicating acceptance of the updated terms for display via the graphical user interface, when the updated terms data compare favorably to the term limits data; and
- generating transaction feedback data indicating rejection of the updated terms for display via the graphical user interface, when the updated terms data compare unfavorably to the term limits data.

For example, the vehicle options data with terms data sent to the mobile device 120 includes, for each of the vehicles selected by the vehicle transaction support system 100 from the vehicle database, a recommended down payment, a recommended number of weekly, biweekly or monthly payments, an annual percentage rate (APR) or other indicator of interest rate and a weekly, biweekly or monthly payment amount. Customer interaction with the GUI of mobile device 120 generates vehicle selection data and updated terms data that is sent to the vehicle transaction support system 100. For example, the vehicle selection data can indicate a selection, by the customer via the interaction with the GUI, a particular one of the vehicles indicated by the vehicle options data. The updated terms data can include a selected modification to the recommended down payment and/or the recommended number of weekly, biweekly or monthly payments. The transaction adjustment engine 310 operates to compare the updated terms data to term limits data, such as maximum number of monthly payments and/or the minimum down payment. If/when the updated terms data compare favorably to the term limits data, i.e. the down payment, if modified, is greater than or equal to the minimum down payment and the number of weekly, biweekly or monthly payments, if modified, is less than or equal to the maximum number of weekly, biweekly or monthly payments, transaction feedback data indicating acceptance of the updated terms and an updated weekly, biweekly or monthly payment is generated and sent for display via the graphical user interface of mobile device 120. If/when the updated terms data compare unfavorably to the term limits data, i.e. the down payment, if modified, is less than the minimum down payment or the number weekly, biweekly or monthly payments, if modified, is greater than the maximum number of weekly, biweekly or monthly payments, transaction feedback data indicating rejection of the updated terms is generated and sent for display via the graphical user interface of mobile device 120.

As previously discussed, some or all of the functions attributed to the vehicle transaction support system 100 can be incorporated in the mobile device 120 and/or performed by the mobile vehicle transaction support application 202. In various embodiments, the terms adjustment functions associated with the terms adjustment subsystem 110 and the transaction adjustment engine 310 can be implemented instead via the mobile vehicle transaction support application 202 and/or other applications, utilities or routines of the mobile device 120, based on vehicle options and terms data from the vehicle transaction support system 100, etc.

FIG. 3I is a schematic block diagram of a transaction adjustment engine in accordance with various embodiments. In the example shown, the transaction adjustment engine 312 or the mobile vehicle transaction support application 202 includes a comparison function 360 such as a comparison routine or other comparator that compares the updated terms data to term limits data, such as maximum number of monthly payments and/or the minimum down payment.

If/when the updated terms data compare favorably to the term limits data, i.e. the down payment, if modified, is greater than or equal to the minimum down payment and the number weekly, biweekly or monthly payments, if modified, is less than or equal to the maximum number of weekly, biweekly or monthly payments, transaction feedback data indicating acceptance of the updated terms and an updated weekly, biweekly or monthly payment is generated and sent for display via the graphical user interface of mobile device 120. If/when the updated terms data compare unfavorably to the term limits data, i.e. the down payment, if modified, is less than the minimum down payment or the number weekly, biweekly or monthly payments, if modified, is greater than the maximum number of weekly, biweekly or monthly payments, transaction feedback data indicating rejection of the updated terms is generated and sent for display via the graphical user interface of mobile device 120.

Figure 3J:
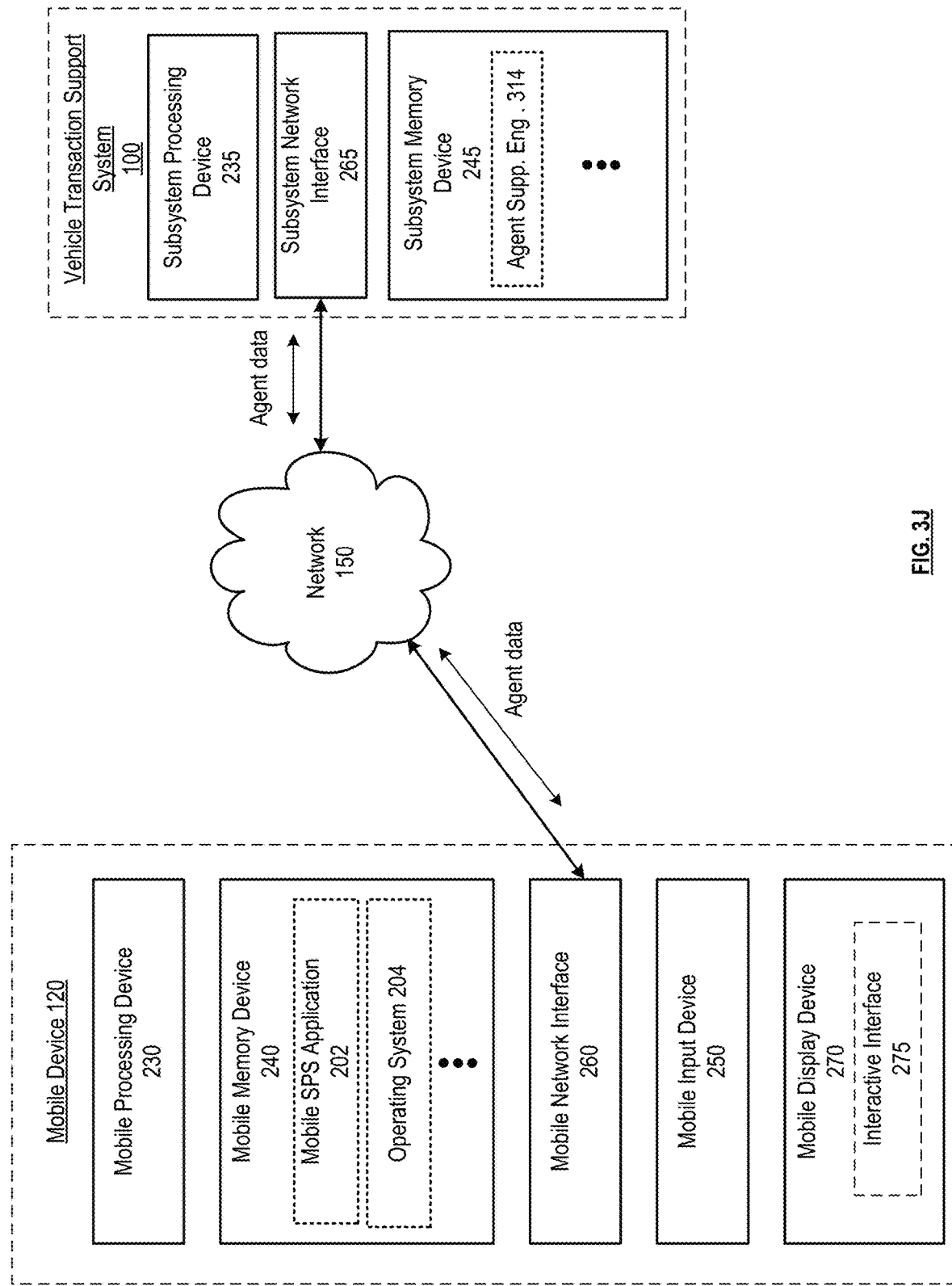
FIG. 3J is a schematic block diagram of a vehicle transaction support system in accordance with various embodiments.

FIG. 3J is a schematic block diagram of a vehicle transaction support system in accordance with various embodiments. In various embodiments, the operation of the mobile device 120 can be controlled by an agent to selectively place the mobile device 120 in an agent mode where some or all of the functions of the vehicle transaction support system 100 are accessible via the mobile device 120 or a customer mode where only a selected subset of the functions of the vehicle transaction support system 100 are accessible via the mobile device 120. The selected subset of the functions available in customer mode can include, for example, customer functions requiring customer interaction with the interactive interface 275—but excluding agent-only functions of the mobile device. For example, the operations of the vehicle transaction support system 100 can include:
- collecting customer input data in either the agent or customer mode of operation of the mobile device;
- sending the vehicle options data and terms data for display via the graphical user interface of a mobile device in either the agent or customer mode of operation of the mobile device;

obtaining vehicle selection data and updated terms data generated via customer interaction with the graphical user interface of mobile device 120 in either the agent or customer mode of operation of the mobile device;

sending transaction feedback data for display via the graphical user interface of mobile device 120 in either the agent or customer mode of operation of the mobile device;

communicating agent data with the mobile device 120 in an agent mode of the mobile device, wherein the agent data is neither displayed nor displayable via the graphical user interface of the mobile device in the customer mode of operation.

Furthermore, switching from customer mode to agent mode and/or from agent mode to customer mode can require agent authentication via password, biometric authentication, two-factor authentication of other security or authentication procedure.

FIGS. 4A-4E are screen displays of an interactive interface in accordance with various embodiments. As previously discussed, customer input data is generated via interaction with a graphical user interface of a mobile device. In particular, screen displays of a graphical user interface, such as interactive interface 275 of mobile device 120 are presented that indicate the collection of portions of the customer input data for a company, Tricolor. The customer input data collected in this fashion is used to used to generate customer prequalification data and other customer profile data, by for example, storing the various fields of input data in corresponding fields of the generate customer prequalification data and/or the other customer profile data, as appropriate.

Figure 4A:
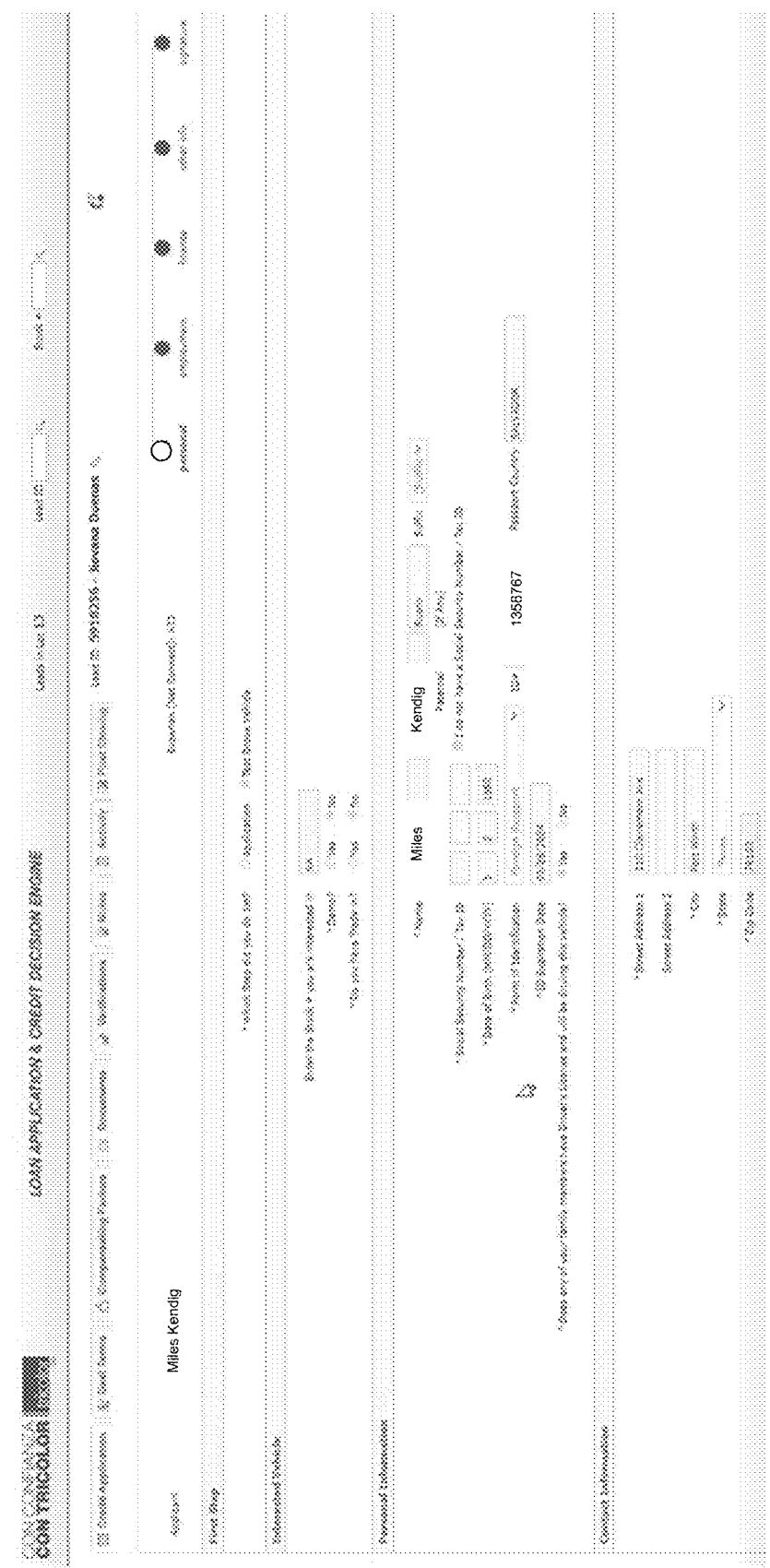
FIGS. 4A-4E are screen displays of an interactive interface in accordance with various embodiments.

Turning now to FIG. 4A, a screen display is shown where a user such as a customer or agent is entering and/or viewing personal information such as name, social security number or tax ID, date of birth, form of identification and ID number, ID expiration date, driver license information on family members, address, etc. Other customer input data indicates the stage of the customer in the process, e.g. application or test drive, a vehicle of interest, the availability of a trade-in, etc.

Figure 4B:
Figure 4C:
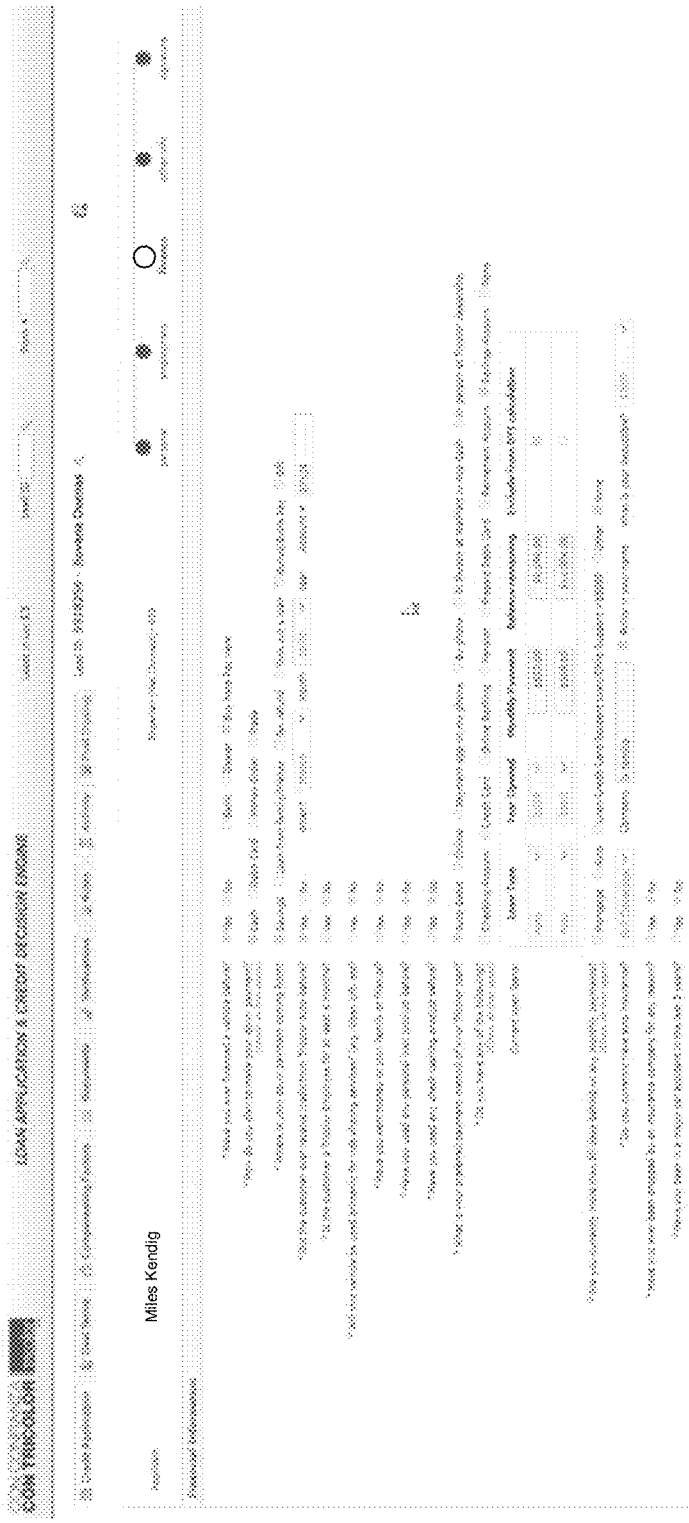

In FIG. 4B, a screen display is shown where a user such as a customer or agent is entering and/or viewing employment information such as employment status, length of current employment, employer, job category, position/titles, company phone and address, net income, work shift, payment method, deposit information, tax information, sources of additional income, etc. In FIG. 4C, a screen display is shown where a user such as a customer or agent is entering and/or viewing financial information such as prior vehicle financing, type and source of down payment, prior company credit, prior company employment, use of the vehicle for ride-sharing, money sent to others, personal loans, check cashing services, payment methods, bank/credit account information, current loan information, current loan payment status, auto insurance information, major accidents, etc.

Figure 4D:
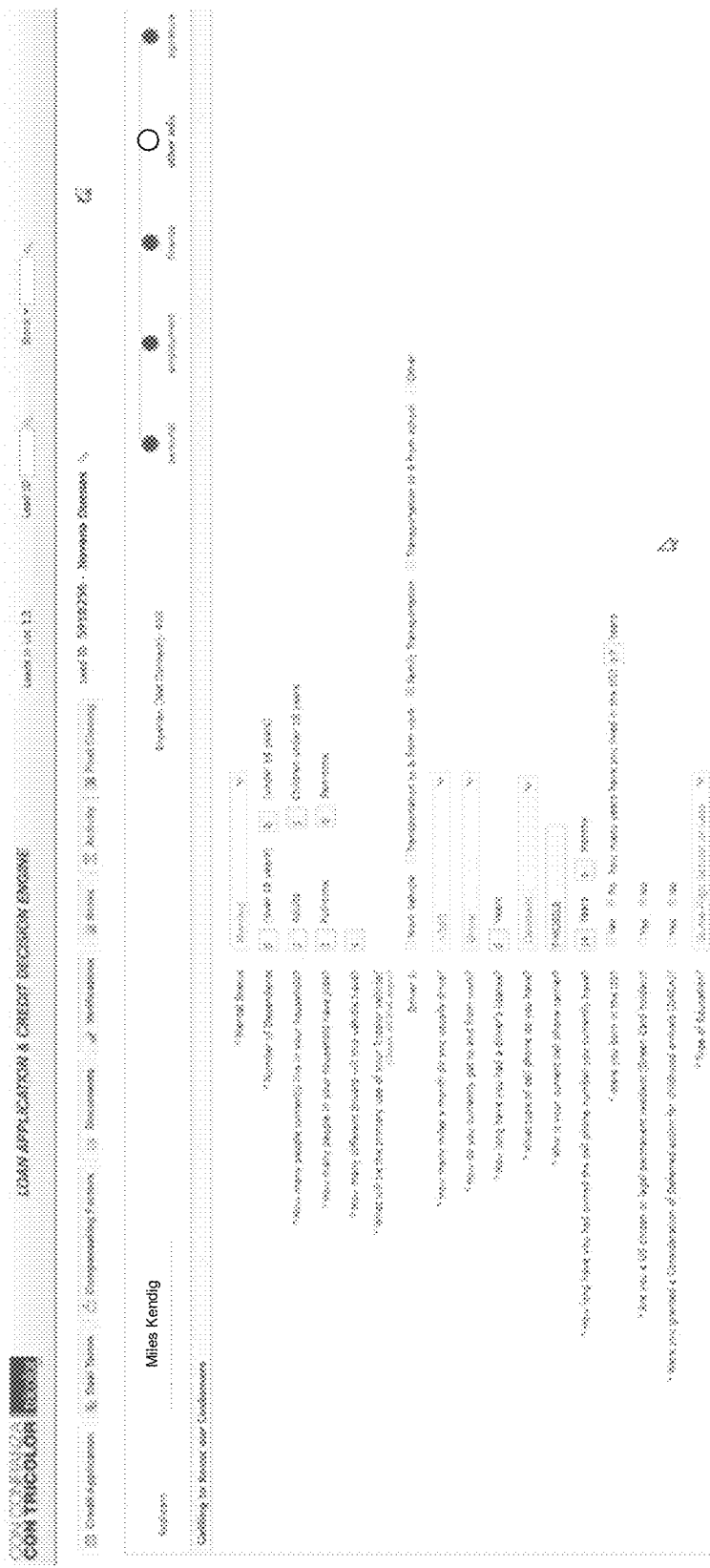
Figure 4E:

In FIG. 4D, a screen display is shown where a user such as a customer or agent is entering and/or viewing other information such as marital status, number of dependents, number of people in the household, number of drivers, household members employed, primary use of the vehicle, monthly mileage, method of transportation to work, time having a driver's license, type of cellphone plan and carrier, time with current telephone number, country of birth, time in the U.S., citizenship/residency/immigration status, type of education, etc. In FIG. 4E, a screen display is shown where a user such as an agent can view information regarding the status of verifications, uploaded supporting documents, etc.

FIGS. 5A-5F are screen displays of an interactive interface in accordance with various embodiments. In particular, screen displays of a graphical user interface, such as interactive interface 275 of mobile device 120 are presented. As previously discussed, the vehicle transaction support system 100 can generate vehicle options data with terms data associated with vehicles selected from a vehicle database 115. This information can be sent to mobile device 120 for display. Vehicle selection data and updated terms data can be generated via customer interaction with the graphical user interface of mobile device 120 and transaction feedback data can be displayed via the graphical user interface of mobile device 120.

Figure 5A:
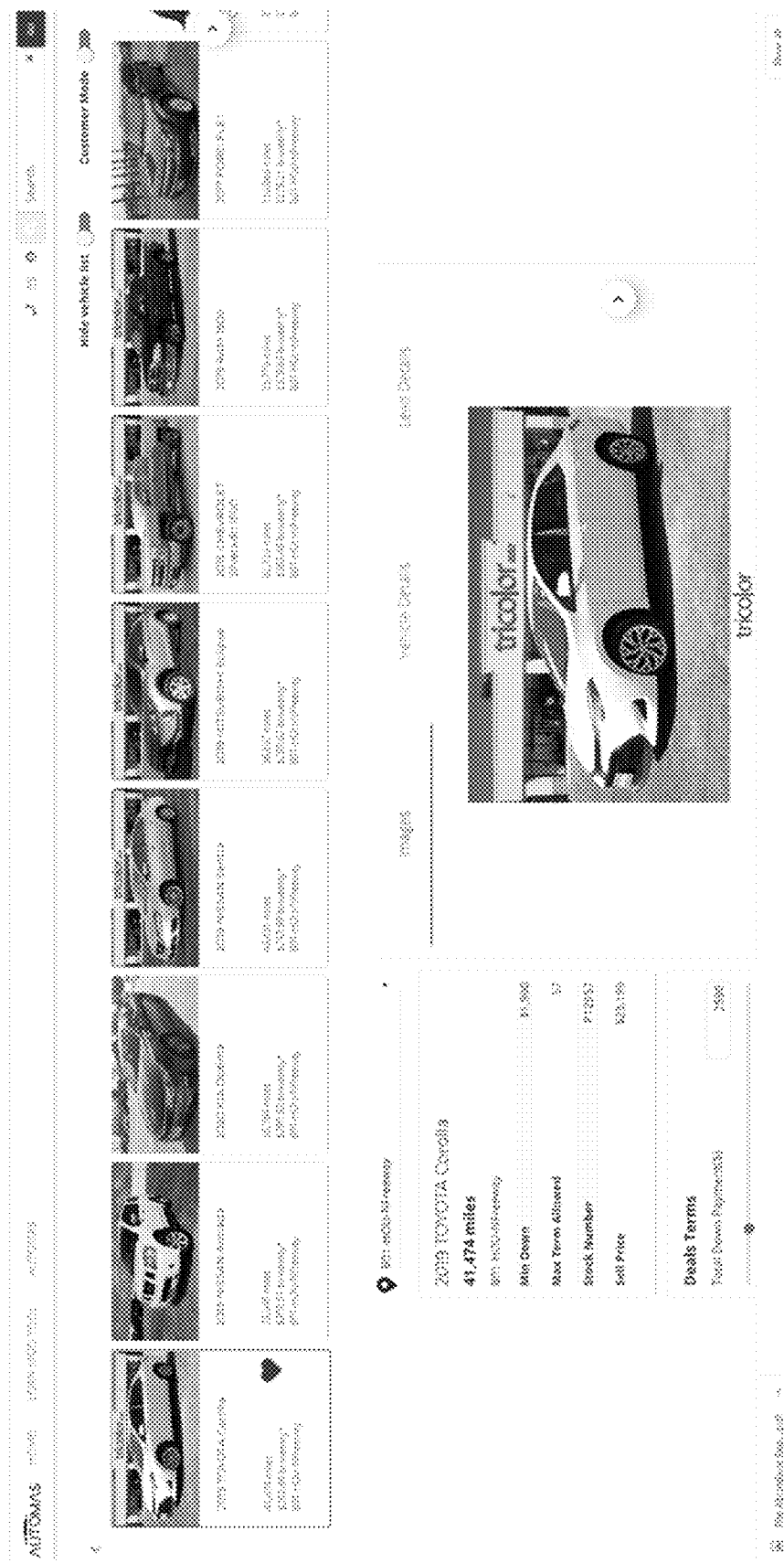
FIGS. 5A-5F are screen displays of an interactive interface in accordance with various embodiments.

Turning now to FIG. 5A, a screen display is presented that includes a vehicle bar with vehicle options data including pictures and summary information pertaining to a plurality of recommended vehicles selected from the vehicle database 115. A right arrow presented in the rightmost portion of the vehicle bar allows the user to scroll to other recommended vehicles. The leftmost vehicle, a 2019 Toyota Corolla with 41,474 miles has been highlighted and further vehicle options data with terms data for this vehicle are displayed including sales price, minimum down payment, maximum number of monthly payments, a vehicle stock number and a recommended down payment. A right arrow next to an enlarged vehicle picture allows the user to scroll through other pictures of the highlighted vehicle. Tabs above the enlarged vehicle picture allow the user to view further vehicle details and lead details regarding the customer.

Figure 5B:
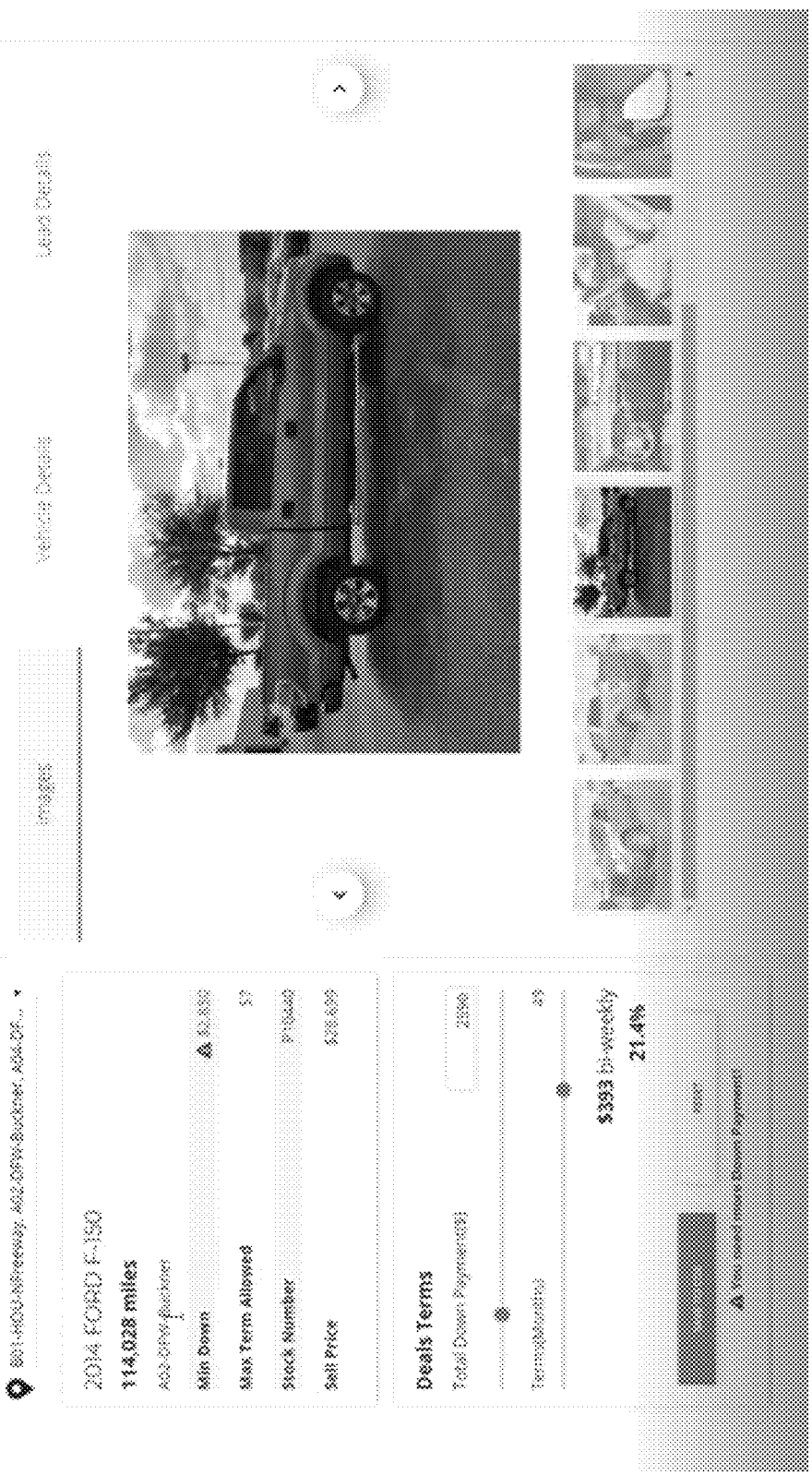
Figure 5C:
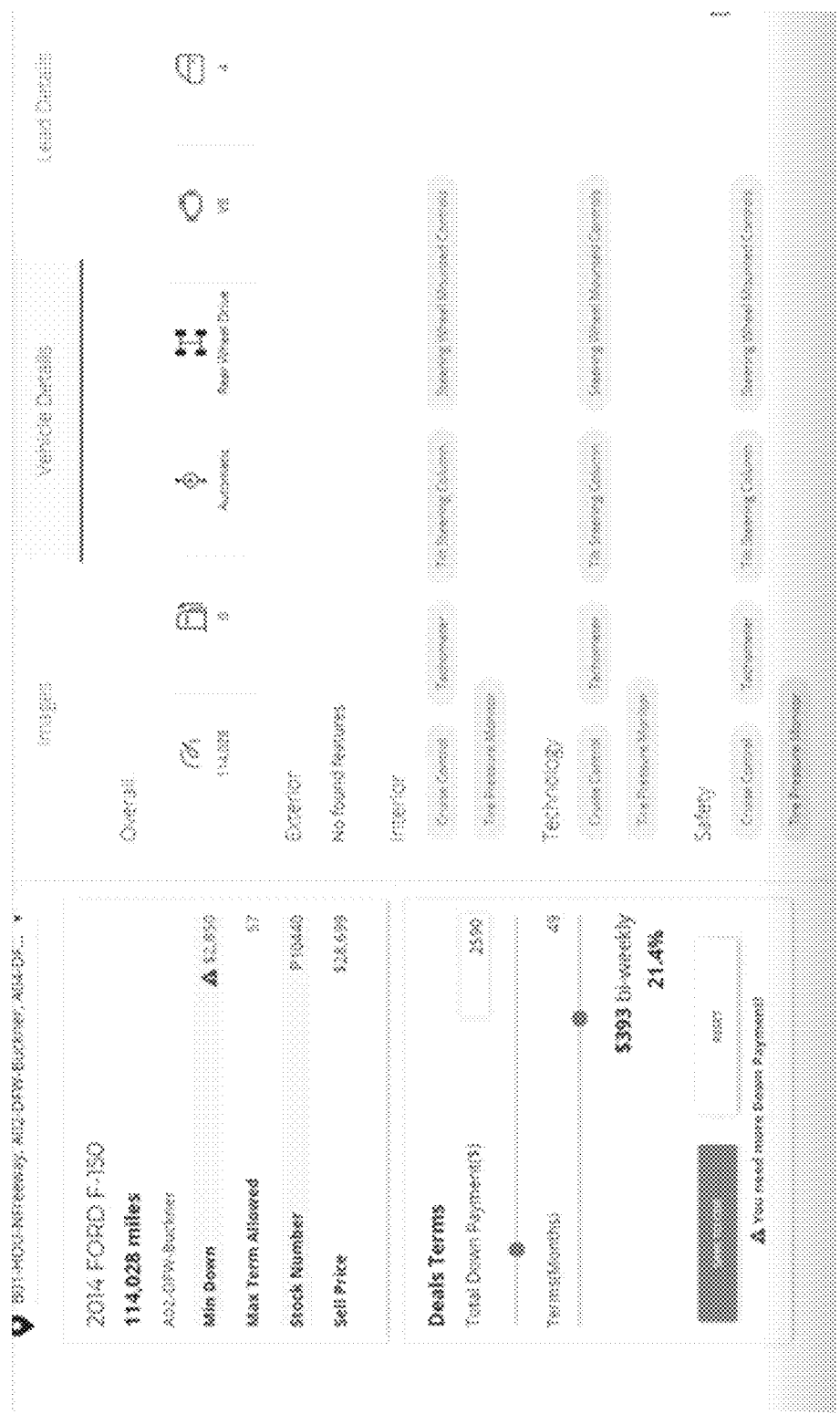

In FIG. 5B, a lower portion of the screen display is shown, where the user has chosen a 2014 Ford F-150 to review. The vehicle bar has been disabled, enabling a vehicle image bar below the enlarged vehicle picture that shows the user's navigation status through a plurality of vehicle images. In this case the user has selected updated terms that include a down payment of 2590 and a 49 month loan that yields a biweekly payment of $393 at 21.4% interest. Feedback data is presented that highlights the minimum down payment requirement of $2850 and that further indicates that more down payment is needed. In FIG. 5C, the user has opted to review the vehicle details via selection of the vehicle details tab.

Figure 5D:
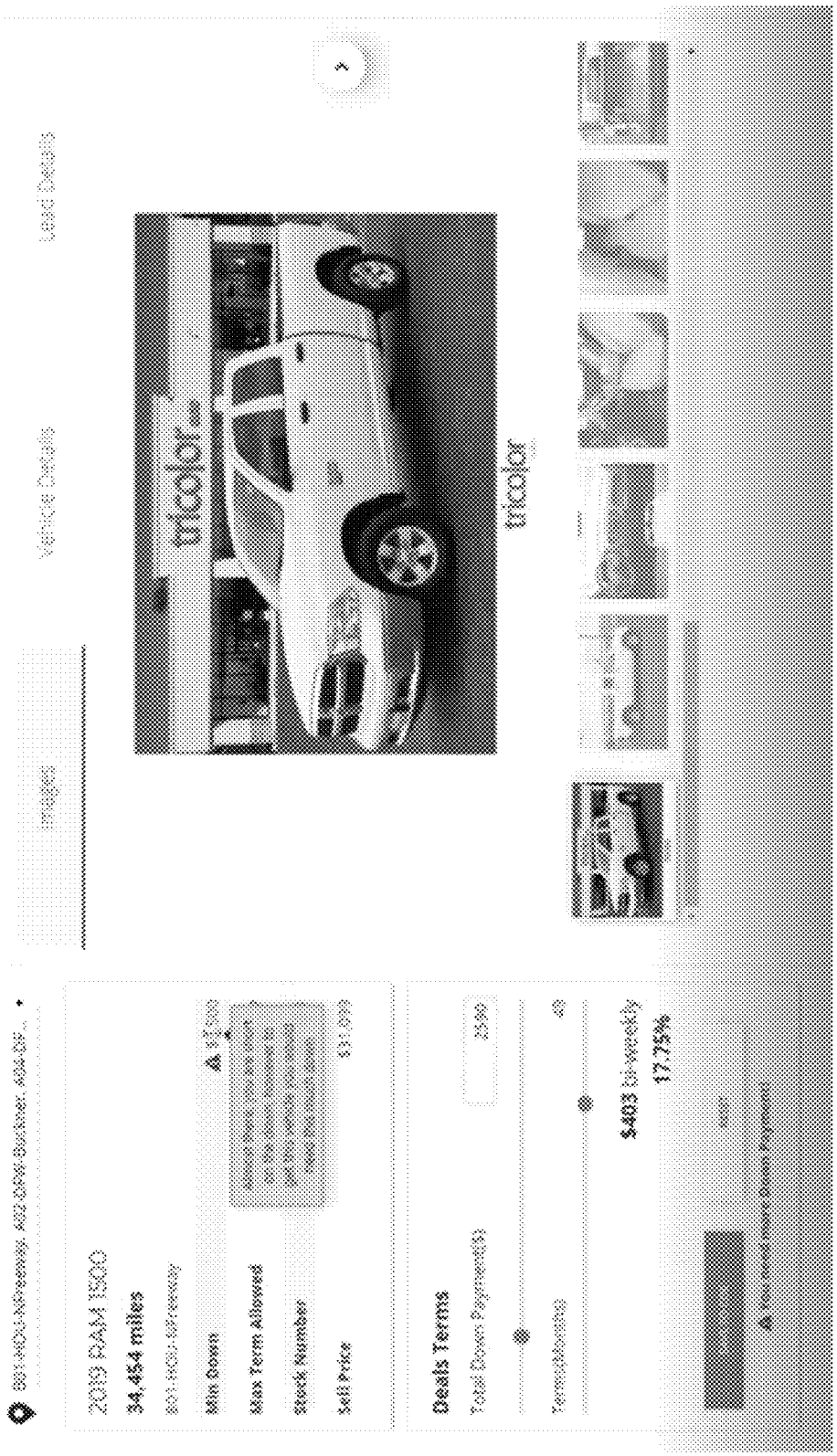
Figure 5E:
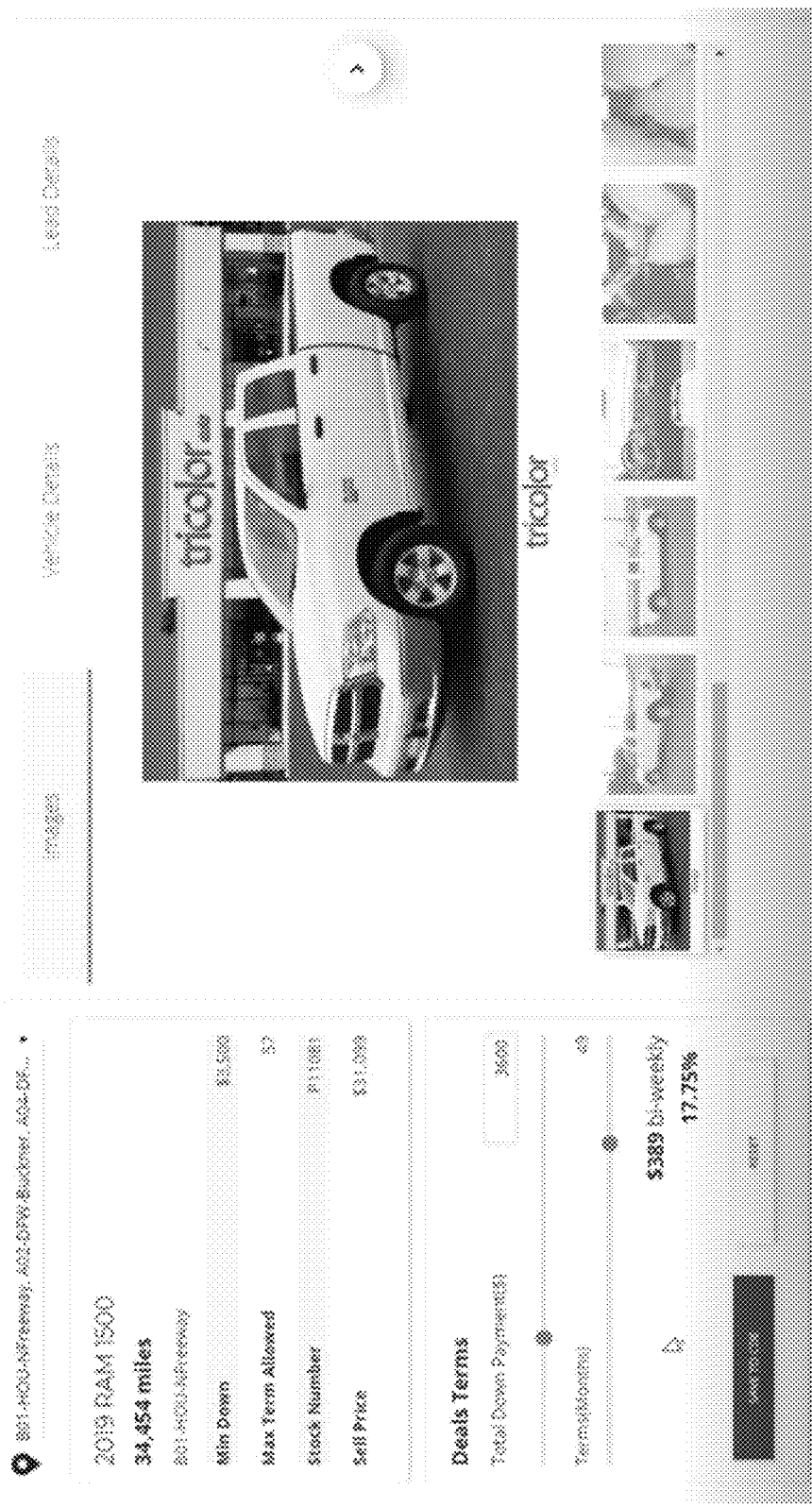
Figure 5F:
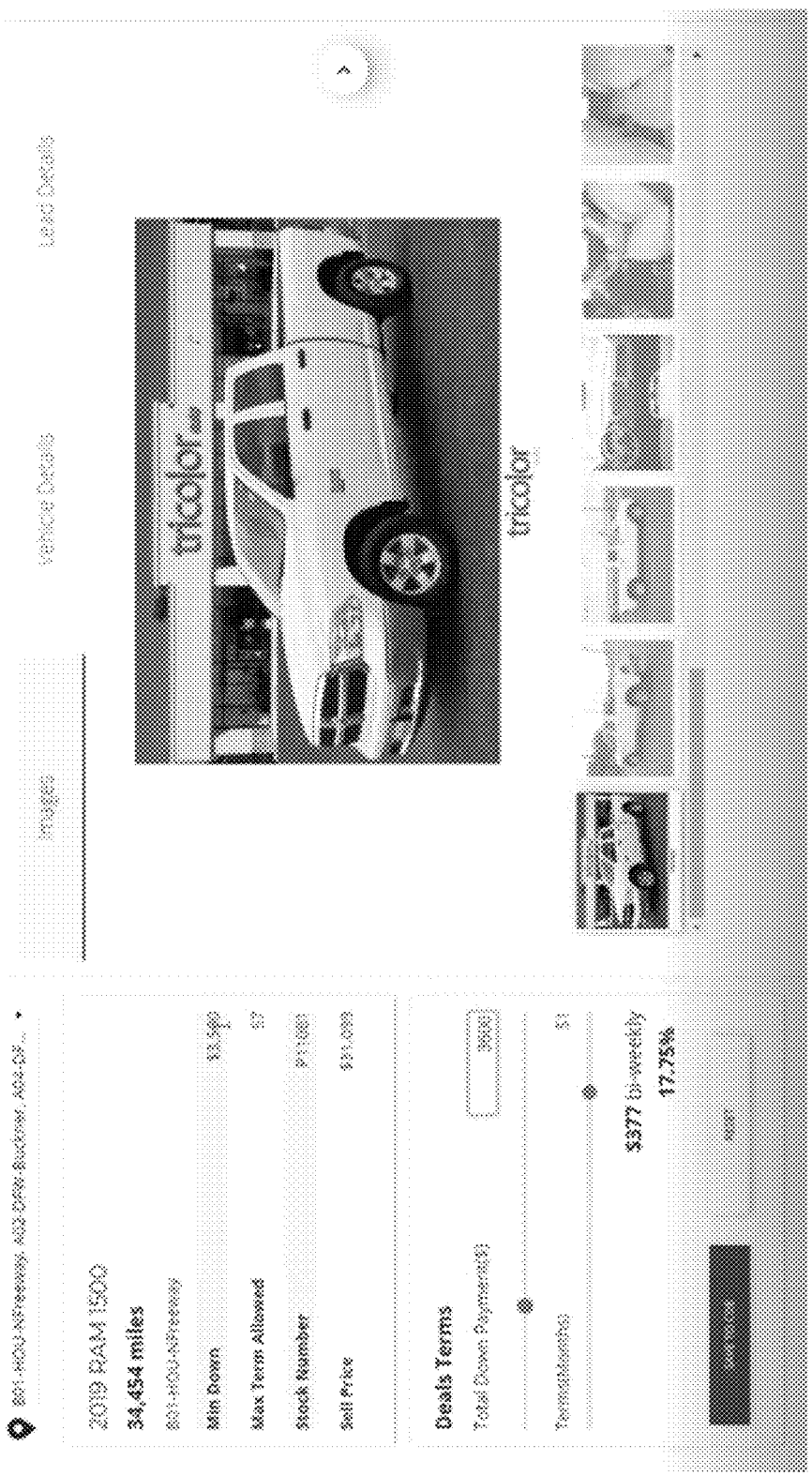

In FIG. 5D, the user has changed to reviewing a different recommended vehicle, a 2019 Dodge Ram 1500. The same down payment of $2590 and 49 month loan length have been selected. In this case, the an additional pop-up message has been generated indicating more down payment is required. In FIG. 5E, the user has generated updated terms data increasing the down payment to $3600, and amount above the minimum. The biweekly payment has decreased to $389 and the Save to CDE button has been enabled in response to feedback data allowing these deal terms and vehicle to be selected for processing. In FIG. 5F, the user has generated updated terms data with a 51 month loan, changing the biweekly payment to $377. Because the down payment is greater than or equal to the minimum and the number of months is still less than or equal to the maximum, feedback data causes the Save to CDE button to be enabled allowing these deal terms and vehicle to be selected for processing.

Figure 6A:
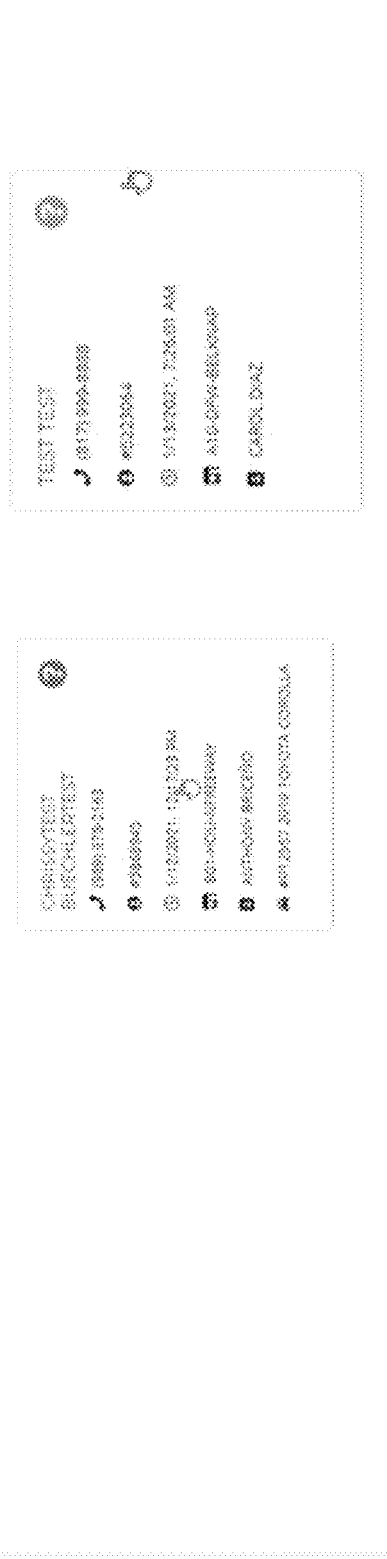
FIGS. 6A-6B are portions of screen displays of an interactive interface in accordance with various embodiments.
Figure 6B:
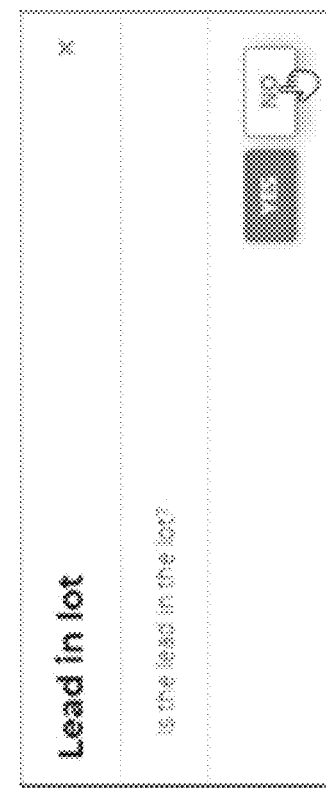

FIGS. 6A-6B are portions of screen displays of an interactive interface in accordance with various embodiments. As previously discussed, the operation of the mobile device 120 can be controlled by an agent to selectively place the mobile device 120 in an agent mode where some or all of the functions of the vehicle transaction support system 100 are accessible via the mobile device 120 or a customer mode where only a selected subset of the functions of the vehicle transaction support system 100 are accessible via the mobile device 120. In FIG. 6A, a screen display is shown where the mobile device 120 is in the agent mode of operation and agent data is presented for display. In this case, information on two different customers is presented. The first customer has been prequalified as indicated by the green "?" icon. The customer's number and numerical identifier are shown in addition to the time and lot location visited, the salesperson and a selected vehicle of interest. The second has not been prequalified as indicated by the orange "?" icon and there has been vehicle selected. In FIG. 6B, the agent can selected a customer and indicate if a selected customer is currently on the lot.

Figure 7A:
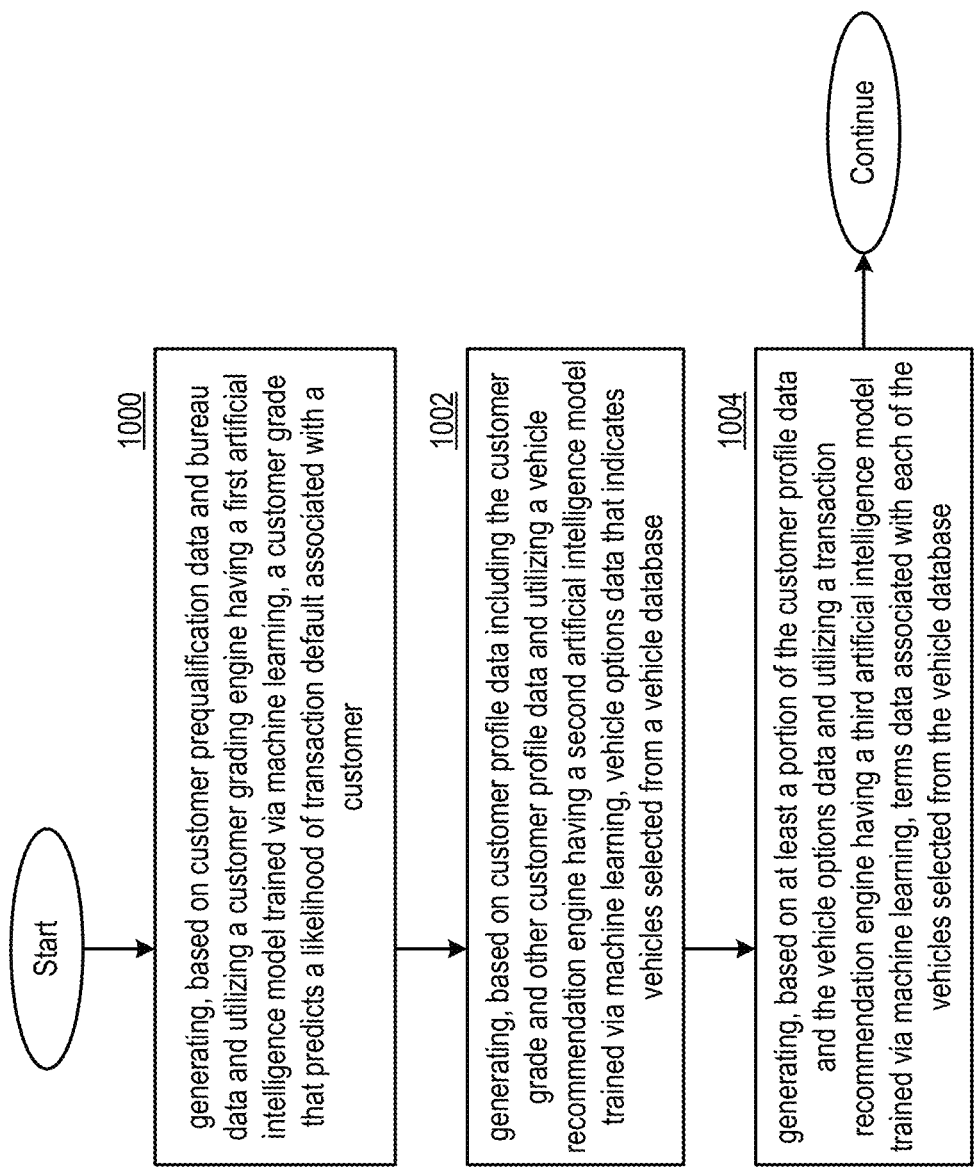
FIGS. 7A-7D are flowchart representations of methods in accordance with various embodiments.

FIGS. 7A-7D are flowchart representations of methods in accordance with various embodiments. In particular, methods are shown for use in conjunction with one or more functions and features described herein. Turning now to FIG. 7A, step 1000 includes generating, based on customer prequalification data and extended bureau data and utilizing a customer grading engine having a first artificial intelligence model trained via machine learning, a customer grade that predicts a likelihood of transaction default associated with a customer. Step 1002 includes generating, based on customer profile data that includes the customer grade and other customer profile data and utilizing a vehicle recommendation engine having a second artificial intelligence model trained via machine learning, vehicle options data that indicates vehicles selected from a vehicle database. Step 1004 includes generating, based on at least a portion of the customer profile data and the vehicle options data and utilizing a transaction recommendation engine having a third artificial intelligence model trained via machine learning, terms data associated with each of the vehicles selected from the vehicle database.

In various embodiments, the extended bureau data includes customer data received from a credit bureau that does not include a credit score. The method can further include: receiving customer input data generated via customer interaction with a graphical user interface; and generating the customer prequalification data and the other customer profile data from the customer input data. The method can further include sending the vehicle options data and terms data for display via a graphical user interface of a mobile device. The method can further include: obtaining vehicle selection data and updated terms data generated via customer interaction with the graphical user interface; comparing the updated terms data to term limits data; generating transaction feedback data indicating acceptance of the updated terms data for display via the graphical user interface, when the updated terms data compare favorably to the term limits data; and generating transaction feedback data indicating rejection of the updated terms for display via the graphical user interface, when the updated terms data compare unfavorably to the term limits data. The method can further include: sending the vehicle options data and terms data for display via a graphical user interface of a mobile device in a customer mode of operation of the mobile device; and communicating agent data with the mobile device in an agent mode of the mobile device, wherein the agent data is not displayed via the graphical user interface of the mobile device in the customer mode of operation.

In various embodiments, the first artificial intelligence model is an ensemble model that includes: a plurality of auto encoding sub-models configured to process the customer prequalification data and the extended bureau data; and a master sub-model configured to generate the customer grade by processing the customer prequalification data and the extended bureau data together with outputs of the plurality of auto encoding sub-models. The second artificial intelligence model can be an ensemble model that includes: a vehicle category selection sub-model configured to generate a selected vehicle category from a plurality of vehicle categories based on the customer profile data; a vehicle parameter selection sub-model configured to generate a plurality of vehicle parameters for the selected vehicle category based on the customer profile data; and a vehicle search engine configured to generate the vehicles selected from the vehicle database based on a search of the vehicle database for vehicles having vehicle data that compares favorably to the vehicle parameters.

In various embodiments, the third artificial intelligence model is an ensemble model that includes: a transaction parameter selection sub-model configured to generate, based on the at least a portion of the customer profile data, transaction parameters that indicate a collection of deal terms predicted for acceptance; and a terms selection sub-model configured to generate, based on the transaction parameters and the vehicle options data the terms data associated with each of the vehicles selected from the vehicle database. The terms selection sub-model can itself be an ensemble model that includes: a first sub-model trained to generate, based on the at least a portion of the customer profile data, the transaction parameters, and the vehicle options data, a net present value based on non-defaulting transactions; a second sub-model trained to generate, based on the at least a portion of the customer profile data, the transaction parameters, and the vehicle options data, a net present value based on defaulting transactions; a third sub-model trained to generate, based on the at least a portion of the customer profile data, the transaction parameters, and the vehicle options data, probability of default; and a net present value function configured to generate the terms data associated with each of the vehicles selected from the vehicle database, based on outputs from the first sub-model, the second sub-model and the third sub-model.

Figure 7B:
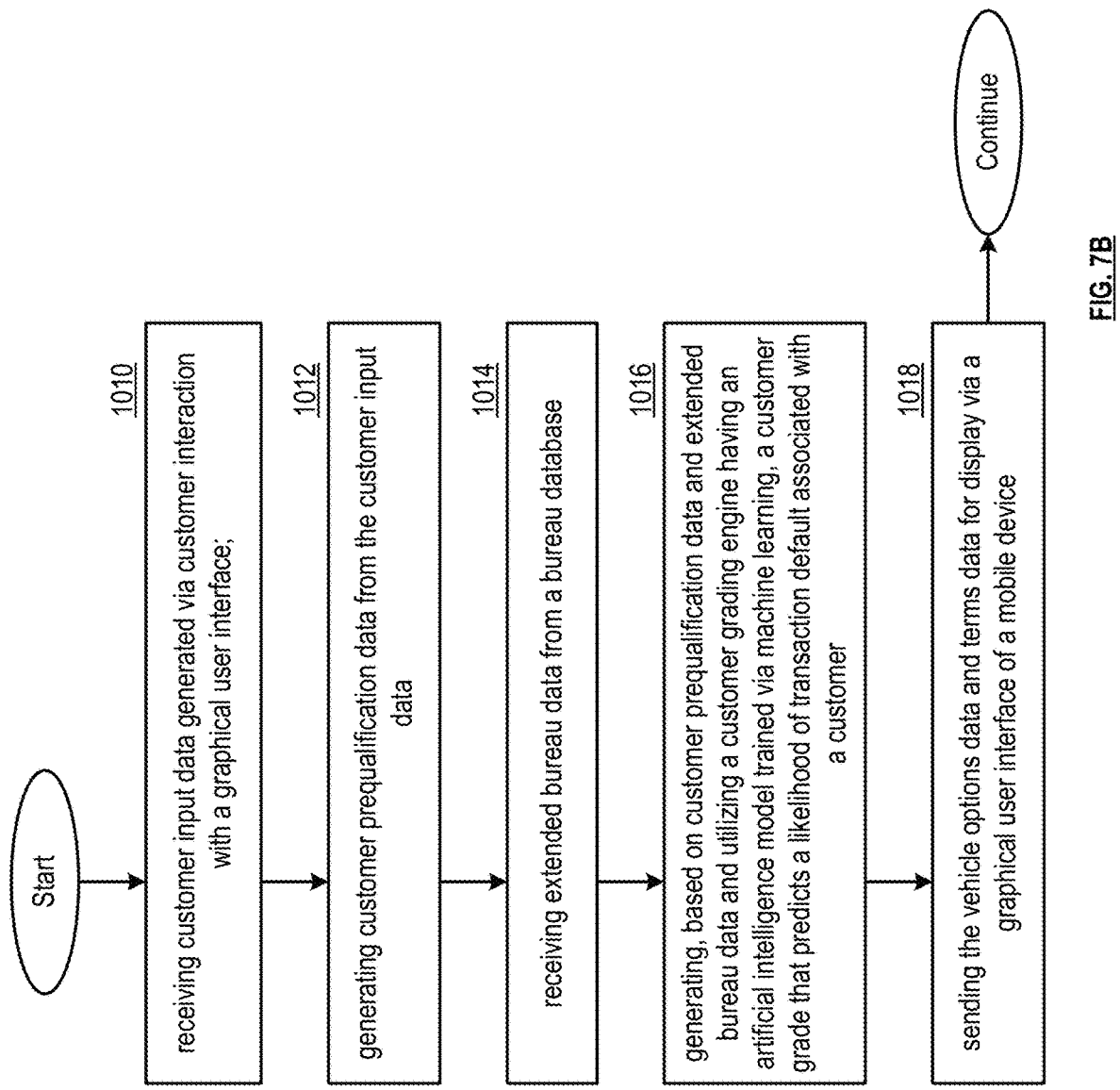

Turning now to FIG. 7B, step 1010 includes receiving customer input data generated via customer interaction with a graphical user interface. Step 1012 includes generating customer prequalification data from the customer input data. Step 1014 includes receiving extended bureau data from a bureau database. Step 1016 includes generating, based on customer prequalification data and extended bureau data and utilizing a customer grading engine having an artificial intelligence model trained via machine learning, a customer grade that predicts a likelihood of transaction default associated with a customer. Step 1018 includes sending the vehicle options data and terms data for display via a graphical user interface of a mobile device.

Figure 7C:
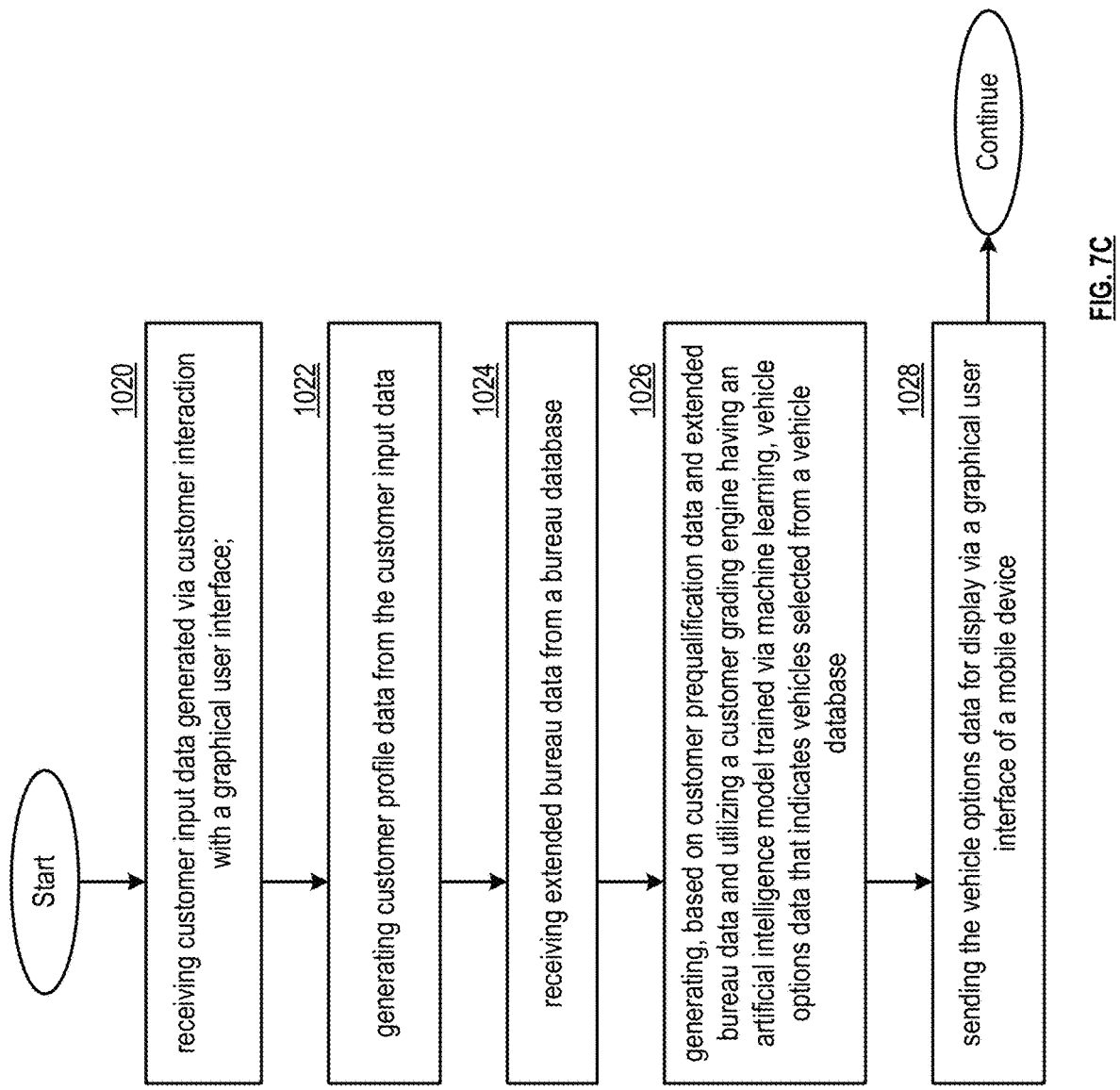

Turning now to FIG. 7C, step 1020 includes receiving customer input data generated via customer interaction with a graphical user interface. Step 1022 includes generating customer profile data from the customer input data. Step 1024 includes receiving extended bureau data from a bureau database. Step 1026 includes generating, based on customer profile data and extended bureau data and utilizing a vehicle recommendation engine having an artificial intelligence model trained via machine learning, vehicle options data that indicates vehicles selected from a vehicle database. Step 1022 includes sending the vehicle options data for display via a graphical user interface of a mobile device.

Figure 7D:
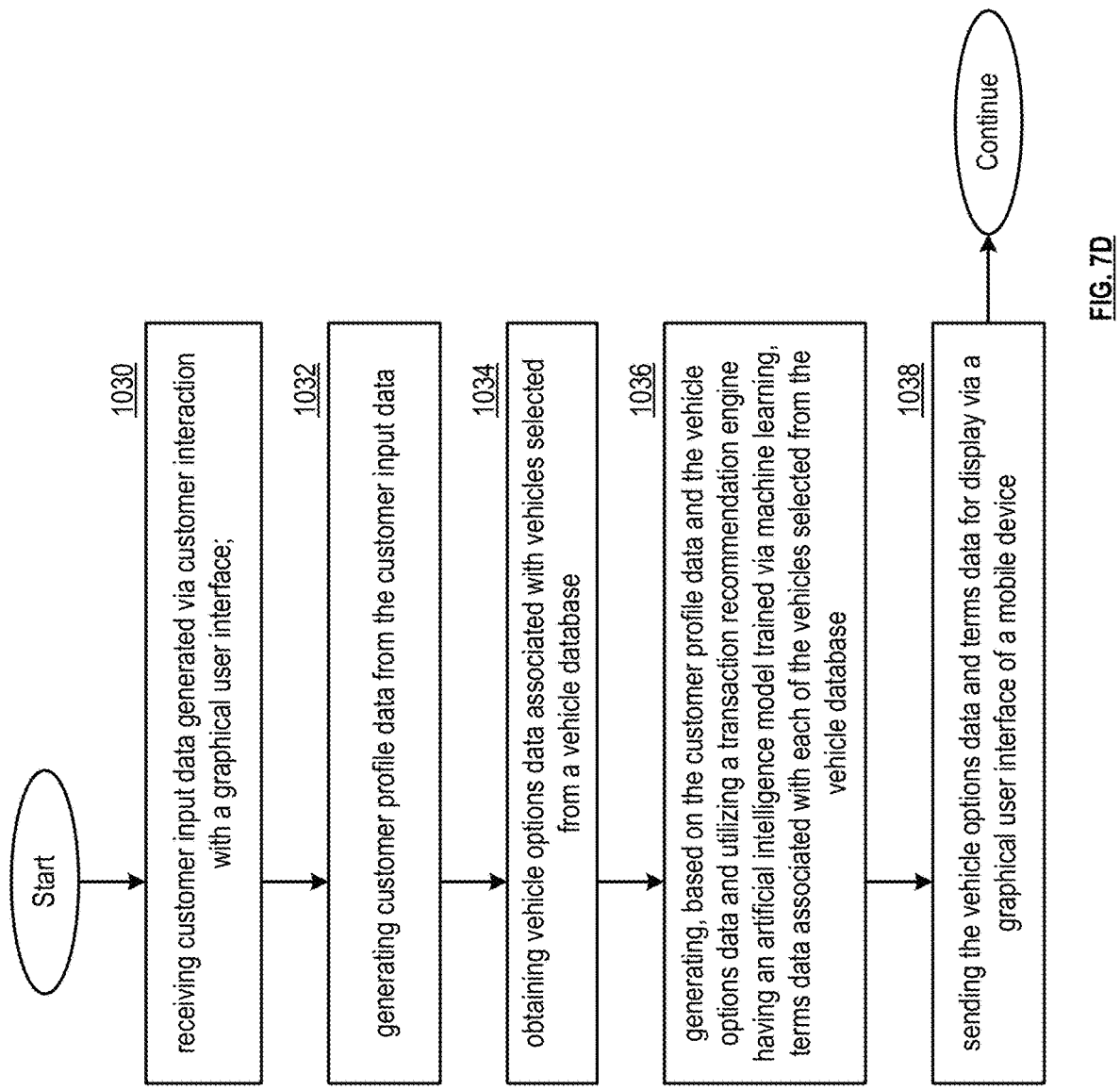

Turning now to FIG. 7D, step 1030 includes receiving customer input data generated via customer interaction with a graphical user interface. Step 1032 includes generating customer profile data from the customer input data. Step 1034 includes obtaining vehicle options data associated with vehicles selected from a vehicle database. Step 1036 includes generating, based on the customer profile data and the vehicle options data and utilizing a transaction recommendation engine having an artificial intelligence model trained via machine learning, terms data associated with each of the vehicles selected from the vehicle database. Step 1038 includes sending the vehicle options data with the terms data for display via a graphical user interface of a mobile device.

While the foregoing has focused on systems and methods for supporting vehicle transactions, these systems and methods could likewise be used similarly for other assets including homes, boats, investments, home and apartment rentals, and other assets and transactions.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A vehicle transaction support system, comprising:
    at least one processing system that includes a processor; and
    at least one memory including a non-transitory computer readable storage medium that stores executable instructions that, when executed by the at least one processing system, cause performance of operations that include:
        generating, based on customer prequalification data and extended bureau data and utilizing a customer grading engine having a first artificial intelligence model trained via machine learning, a customer grade that predicts a likelihood of transaction default associated with a customer, wherein the extended bureau data includes customer data received from a credit bureau that does not include a credit score;

generating, based on customer profile data that includes the customer grade and other customer profile data and utilizing a vehicle recommendation engine having a second artificial intelligence model trained via machine learning, vehicle options data that indicates vehicles selected from a vehicle database;

generating, based on at least a portion of the customer profile data and the vehicle options data and utilizing a transaction recommendation engine having a third artificial intelligence model trained via machine learning, terms data associated with each of the vehicles selected from the vehicle database;

sending the vehicle options data and terms data for display via a graphical user interface of a mobile device in a customer mode of operation of the mobile device; and communicating agent data with the mobile device in an agent mode of the mobile device, wherein the agent data is not displayed via the graphical user interface of the mobile device in the customer mode of operation.

2. The vehicle transaction support system of claim 1, wherein the operations further include:
receiving customer input data generated via customer interaction with a graphical user interface; and
generating the customer prequalification data and the other customer profile data from the customer input data.

3. The vehicle transaction support system of claim 1, wherein the operations further include:
obtaining vehicle selection data and updated terms data generated via customer interaction with the graphical user interface; and
comparing the updated terms data to term limits data;
generating transaction feedback data indicating acceptance of the updated terms data for display via the graphical user interface, when the updated terms data compare favorably to the term limits data; and
generating transaction feedback data indicating rejection of the updated terms for display via the graphical user interface, when the updated terms data compare unfavorably to the term limits data.

4. The vehicle transaction support system of claim 1, wherein the first artificial intelligence model is an ensemble model that includes:
a plurality of auto encoding sub-models configured to process the customer prequalification data and the extended bureau data; and
a master sub-model configured to generate the customer grade by processing the customer prequalification data and the extended bureau data together with outputs of the plurality of auto encoding sub-models.

5. The vehicle transaction support system of claim 1, wherein the second artificial intelligence model is an ensemble model that includes:
a vehicle category selection sub-model configured to generate a selected vehicle category from a plurality of vehicle categories based on the customer profile data;
a vehicle parameter selection sub-model configured to generate a plurality of vehicle parameters for the selected vehicle category based on the customer profile data; and
a vehicle search engine configured to generate the vehicles selected from the vehicle database based on a search of the vehicle database for vehicles having vehicle data that compares favorably to the vehicle parameters.

6. The vehicle transaction support system of claim 1, wherein the third artificial intelligence model is an ensemble model that includes:
a transaction parameter selection sub-model configured to generate, based on the at least a portion of the customer profile data, transaction parameters that indicate a collection of deal terms predicted for acceptance; and
a terms selection sub-model configured to generate, based on the transaction parameters and the vehicle options data, the terms data associated with each of the vehicles selected from the vehicle database.

7. The vehicle transaction support system of claim 6, wherein the terms selection sub-model is an ensemble model that includes:
a first sub-model trained to generate, based on the at least a portion of the customer profile data, the transaction parameters, and the vehicle options data, a net present value based on non-defaulting transactions;
a second sub-model trained to generate, based on the at least a portion of the customer profile data, the transaction parameters, and the vehicle options data, a net present value based on defaulting transactions;
a third sub-model trained to generate, based on the at least a portion of the customer profile data, the transaction parameters, and the vehicle options data, probability of default;
a net present value function configured to generate the terms data associated with each of the vehicles selected from the vehicle database, based on outputs from the first sub-model, the second sub-model and the third sub-model.

8. A method comprising:
generating, based on customer prequalification data and extended bureau data and utilizing a customer grading engine having a first artificial intelligence model trained via machine learning, a customer grade that predicts a likelihood of transaction default associated with a customer, wherein the extended bureau data includes customer data received from a credit bureau that does not include a credit score;
generating, based on customer profile data that includes the customer grade and other customer profile data and utilizing a vehicle recommendation engine having a second artificial intelligence model trained via machine learning, vehicle options data that indicates vehicles selected from a vehicle database;
generating, based on at least a portion of the customer profile data and the vehicle options data and utilizing a transaction recommendation engine having a third artificial intelligence model trained via machine learning, terms data associated with each of the vehicles selected from the vehicle database;
sending the vehicle options data and terms data for display via a graphical user interface of a mobile device in a customer mode of operation of the mobile device; and
communicating agent data with the mobile device in an agent mode of the mobile device, wherein the agent data is not displayed via the graphical user interface of the mobile device in the customer mode of operation.

9. The method of claim 8, further comprising:
receiving customer input data generated via customer interaction with the graphical user interface; and
generating the customer prequalification data and the other customer profile data from the customer input data.

10. The method of claim 8, further comprising:

obtaining vehicle selection data and updated terms data generated via customer interaction with the graphical user interface;

comparing the updated terms data to term limits data;

generating transaction feedback data indicating acceptance of the updated terms data for display via the graphical user interface, when the updated terms data compare favorably to the term limits data; and generating transaction feedback data indicating rejection of the updated terms for display via the graphical user interface, when the updated terms data compare unfavorably to the term limits data.

11. The method of claim 8, wherein the first artificial intelligence model is an ensemble model that includes:
   a plurality of auto encoding sub-models configured to process the customer prequalification data and the extended bureau data; and
   a master sub-model configured to generate the customer grade by processing the customer prequalification data and the extended bureau data together with outputs of the plurality of auto encoding sub-models.

12. The method of claim 8, wherein the second artificial intelligence model is an ensemble model that includes:
   a vehicle category selection sub-model configured to generate a selected vehicle category from a plurality of vehicle categories based on the customer profile data;
   a vehicle parameter selection sub-model configured to generate a plurality of vehicle parameters for the selected vehicle category based on the customer profile data; and
   a vehicle search engine configured to generate the vehicles selected from the vehicle database based on a search of the vehicle database for vehicles having vehicle data that compares favorably to the vehicle parameters.

13. The method of claim 8, wherein the third artificial intelligence model is an ensemble model that includes:
   a transaction parameter selection sub-model configured to generate, based on the at least a portion of the customer profile data, transaction parameters that indicate a collection of deal terms predicted for acceptance; and
   a terms selection sub-model configured to generate, based on the transaction parameters and the vehicle options data, the terms data associated with each of the vehicles selected from the vehicle database.

14. The method of claim 13, wherein the terms selection sub-model is an ensemble model that includes:
   a first sub-model trained to generate, based on the at least a portion of the customer profile data, the transaction parameters, and the vehicle options data, a net present value based on non-defaulting transactions;
   a second sub-model trained to generate, based on the at least a portion of the customer profile data, the transaction parameters, and the vehicle options data, a net present value based on defaulting transactions;
   a third sub-model trained to generate, based on the at least a portion of the customer profile data, the transaction parameters, and the vehicle options data, probability of default; and
   a net present value function configured to generate the terms data associated with each of the vehicles selected from the vehicle database, based on outputs from the first sub-model, the second sub-model and the third sub-model.

* * * * *